United States Patent
Shibamori

(10) Patent No.: US 12,039,207 B2
(45) Date of Patent: Jul. 16, 2024

(54) INFORMATION PROCESSING APPARATUS, METHOD OF CONTROLLING INFORMATION PROCESSING APPARATUS, AND STORAGE MEDIUM FOR PROCESSING FLOW OF MANUAL DOUBLE-SIDED PRINTING FUNCTION

(71) Applicant: CANON KABUSHIKI KAISHA, Tokyo (JP)

(72) Inventor: Tomoki Shibamori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/505,166

(22) Filed: Nov. 9, 2023

(65) Prior Publication Data

US 2024/0069819 A1    Feb. 29, 2024

Related U.S. Application Data

(63) Continuation of application No. 17/820,469, filed on Aug. 17, 2022, now Pat. No. 11,875,066.

(30) Foreign Application Priority Data

Aug. 31, 2021   (JP) .................... 2021-141465

(51) Int. Cl.
 *G06F 3/12* (2006.01)
(52) U.S. Cl.
 CPC ............ *G06F 3/1205* (2013.01); *G06F 3/121* (2013.01); *G06F 3/1228* (2013.01); *G06F 3/1243* (2013.01)
(58) Field of Classification Search
 CPC ...... G06F 3/1205; G06F 3/121; G06F 3/1228; G06F 3/1243

USPC .......................................................... 358/1.15
 See application file for complete search history.

(56) References Cited

U.S. PATENT DOCUMENTS

| | | | |
|---|---|---|---|
| 8,194,276 B2 * | 6/2012 | Natori | B41J 3/60 |
| | | | 358/1.9 |
| 10,942,693 B2 | 3/2021 | Shibamori | |
| 2005/0030333 A1 | 2/2005 | Takahashi | |
| 2006/0133844 A1 | 6/2006 | Konno | |
| 2006/0204270 A1 | 9/2006 | Abe | |

(Continued)

FOREIGN PATENT DOCUMENTS

JP    2019-74906 A    5/2019

OTHER PUBLICATIONS

European Search Report issued Feb. 14, 2023 in corresponding European U.S. Appl. No. 17/820,469 (Cited during prosecution of parent U.S. Appl. No. 17/820,469).

*Primary Examiner* — Allen H Nguyen
(74) *Attorney, Agent, or Firm* — VENABLE LLP

(57) ABSTRACT

Provided is a method of controlling an information processing apparatus configured to execute an extension application associated with printing data generation software operable in the information processing apparatus to extend a function, the method including: obtaining input data including printing setting; displaying a screen related to a specific function on a display unit in a case where it is determined based on the printing setting that the specific function is executed; editing the input data, such that the specific function is executed, to convert the input data into printing data; and transmitting the printing data to a printing apparatus after the screen is displayed on the display unit in the displaying.

17 Claims, 21 Drawing Sheets

(56) References Cited

U.S. PATENT DOCUMENTS

| | | |
|---|---|---|
| 2006/0274331 A1 | 12/2006 | Kawasaki |
| 2008/0225330 A1 | 9/2008 | Matsuura |
| 2010/0195134 A1 | 8/2010 | Miyata |
| 2018/0367685 A1* | 12/2018 | Kuno .................. H04N 1/00514 |
| 2019/0332048 A1 | 10/2019 | Yamanaka |
| 2021/0117135 A1 | 4/2021 | Suzuki |

* cited by examiner

```xml
<?xml version="1.0" encoding="utf-8"?>
<PrintDeviceCapabilities...>
...
<psk:PageMediaSize psf2:psftype="Feature">
    <psk:ISOA4 psf2:psftype="Option" psf2:default="true">
        <psk12:PortraitImageableSize...>0,0,210000,297000</psk12:PortraitImageableSize>
        <psk:MediaSizeHeight xsi:type="xsd:integer" psf2:psftype="ScoredProperty">297000</psk:MediaSizeHeight>
        <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
        <psk12:PortraitImageableSize ...>0,0,215900,279400</psk12:PortraitImageableSize>
        <psk:MediaSizeHeight xsi:type="xsd:integer" psf2:psftype="ScoredProperty">279400</psk:MediaSizeHeight>
        <psk:MediaSizeWidth xsi:type="xsd:integer" psf2:psftype="ScoredProperty">215900</psk:MediaSizeWidth>
    </psk:NorthAmericaLetter>
</psk:PageMediaSize>
...
<psk:JobDuplexAllDocumentsContiguously psf2:psftype="Feature">
    <psk:OneSided psf2:psftype="Option" psf2:default="true"/>
    <psk:TwoSidedLongEdge psf2:psftype="Option"/>
    <psk:TwoSidedShortEdge psf2:psftype="Option"/>
</psk:JobDuplexAllDocumentsContiguously>
...
</PrintDeviceCapabilities>
```

FIG.4

```xml
<?xml version="1.0" encoding="utf-8"?>
<PrintDeviceCapabilities
xmlns:ns0001="http://www.canon.com/ns/printschema/inkjet/v100" ...>
    ...
    <psk:PageMediaSize psf2:psftype="Feature">
        <psk:ISOA4 psf2:psftype="Option" psf2:default="true">
            <psk12:PortraitImageableSize...>0,0,210000,297000</psk12:PortraitImageableSize>
            <psk:MediaSizeHeight xsi:type="xsd:integer" psf2:psftype="ScoredProperty">297000</psk:MediaSizeHeight>
            <psk:MediaSizeWidth xsi:type="xsd:integer" psf2:psftype="ScoredProperty">210000</psk:MediaSizeWidth>
        </psk:ISOA4>
        <psk:NorthAmericaLetter psf2:psftype="Option">
            <psk12:PortraitImageableSize ...>0,0,215900,279400</psk12:PortraitImageableSize>
            <psk:MediaSizeHeight xsi:type="xsd:integer" psf2:psftype="ScoredProperty">279400</psk:MediaSizeHeight>
            <psk:MediaSizeWidth xsi:type="xsd:integer" psf2:psftype="ScoredProperty">215900</psk:MediaSizeWidth>
        </psk:NorthAmericaLetter>
    </psk:PageMediaSize>
    ...
    <psk:JobDuplexAllDocumentsContiguously psf2:psftype="Feature">
        <psk:OneSided psf2:psftype="Option" psf2:default="true"/>
        <psk:TwoSidedLongEdge psf2:psftype="Option"/>
        <psk:TwoSidedShortEdge psf2:psftype="Option"/>
    </psk:JobDuplexAllDocumentsContiguously>
    ...
    <ns0001:JobDuplexMode psf2:psftype="Feature">
        <psf:Option name="ns0001:Auto" psf2:psftype="Option" psf2:default="true"/>
        <psf:Option name="ns0001:Manual" psf2:psftype="Option"/>
    </psk:JobDuplexMode>
    <ns0001:JobDuplexSide psf2:psftype="Feature">
        <psf:Option name="ns0001:Front" psf2:psftype="Option" psf2:default="true"/>
        <psf:Option name="ns0001:Back" psf2:psftype="Option"/>
    </ns0001:JobDuplexSide>
    ...
</PrintDeviceCapabilities>
```

FIG.5

```xml
<?xml version="1.0" encoding="utf-8"?>
<PrintDeviceCapabilities
xmlns:ns0001="http://www.canon.com/ns/printschema/inkjet/v100" ...>
...
<psk:PageMediaSize psf2:psftype="Feature">
    <psk:ISOA4 psf2:psftype="Option" psf2:default="true">
        <psk12:PortraitImageableSize...>0,0,210000,297000</psk12:PortraitImageableSize>
        <psk:MediaSizeHeight xsi:type="xsd:integer" psf2:psftype="ScoredProperty">297000</psk:MediaSizeHeight>
        <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
        <psk12:PortraitImageableSize ...>0,0,215900,279400</psk12:PortraitImageableSize>
        <psk:MediaSizeHeight xsi:type="xsd:integer" psf2:psftype="ScoredProperty">279400</psk:MediaSizeHeight>
        <psk:MediaSizeWidth xsi:type="xsd:integer" psf2:psftype="ScoredProperty">215900</psk:MediaSizeWidth>
    </psk:NorthAmericaLetter>
</psk:PageMediaSize>
...
<psk:JobDuplexAllDocumentsContiguously psf2:psftype="Feature">
    <psk:OneSided psf2:psftype="Option" psf2:default="true"/>
    <psk:TwoSidedLongEdge psf2:psftype="Option"/>
    <psk:TwoSidedShortEdge psf2:psftype="Option"/>
</psk:JobDuplexAllDocumentsContiguously>

<ns0001:JobDuplexMode psf2:psftype="Feature">
    <psf:Option name="ns0001:Auto" psf2:default="true"/>
    <psf:Option name="ns0001:Manual" psf2:psftype="Option"/>
</ns0001:JobDuplexMode>
...
</PrintDeviceCapabilities>
```

INFORMATION PROCESSING APPARATUS, METHOD OF CONTROLLING INFORMATION PROCESSING APPARATUS, AND STORAGE MEDIUM FOR PROCESSING FLOW OF MANUAL DOUBLE-SIDED PRINTING FUNCTION

This application is a continuation of application Ser. No. 17/820,469, filed Aug. 17, 2022, the contents of which are incorporated by reference

BACKGROUND OF THE INVENTION

Field of the Invention

The present disclosure relates to a technique of extending a printing function.

Description of the Related Art

Recent years, there has been provided a standard class driver (hereinafter, also referred to as a "standard driver") that is usable in common in Windows (registered trademark) and the like for printing apparatuses provided by multiple vendors. Such a standard driver is bundled in a package of an operating system (hereinafter, referred to as an "OS"). The standard driver is configured to be able to designate a printing function in accordance with PrintCapabilities generated based on information obtained from a connected printing apparatus. With this, a user using the standard driver can designate a printing function in accordance with the capability of the connected printing apparatus.

It is possible to associate the standard driver with an application for function extension (hereinafter, also referred to as an "extension application"). The extension application is provided by a vendor providing a printing apparatus. The vendor can provide a function that cannot be implemented by only the standard driver (extended function) by providing the extension application. Japanese Patent Laid-Open No. 2019-74906 (PTL 1) discloses a technique of extending a function such as a stamp function by the extension application.

There have been demanded further ingenuities for the extension application to provide a better function.

SUMMARY OF THE INVENTION

A method of controlling an information processing apparatus according to an aspect of the present disclosure is a method of controlling an information processing apparatus configured to execute an extension application associated with printing data generation software operatable in the information processing apparatus to extend a function, the method comprising: obtaining input data including printing setting; displaying a screen related to a specific function on a display unit in a case where it is determined based on the printing setting that the specific function is executed; editing the input data, such that the specific function is executed, to convert the input data into printing data; and transmitting the printing data to a printing apparatus after the screen is displayed on the display unit in the displaying.

Further features of the present invention will become apparent from the following description of exemplary embodiments with reference to the attached renderings.

BRIEF DESCRIPTION OF THE DRAWINGS

FIG. 4 is a diagram illustrating an example of PDC;

FIG. 5 is a diagram illustrating an example of PDC to which a function is added;

FIG. 15 is a diagram illustrating an example of PDC;

DESCRIPTION OF THE EMBODIMENTS

Figure 1:
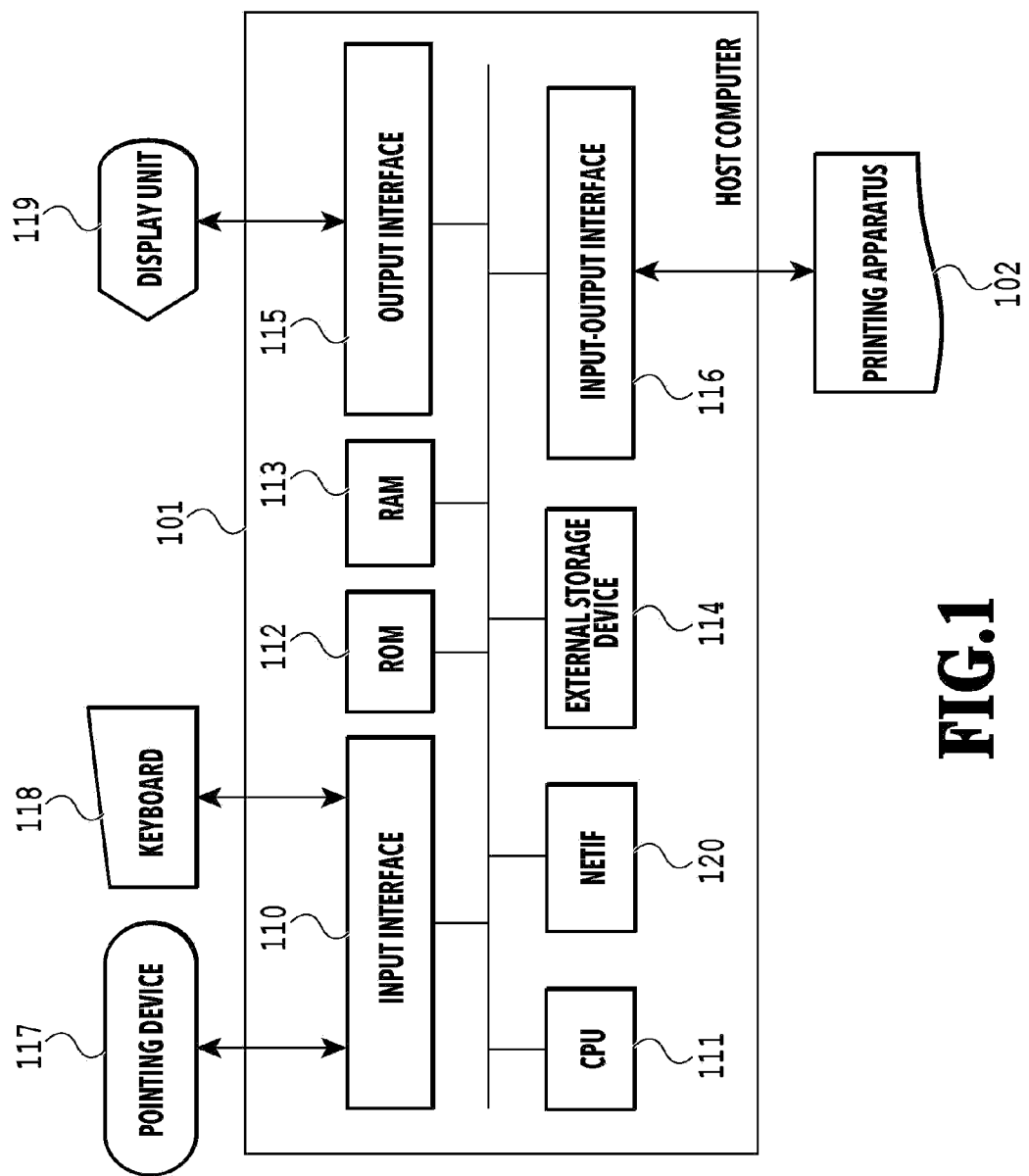
FIG. 1 is a block diagram illustrating a hardware configuration of a printing system.

Preferred embodiments of the present disclosure are described below in detail with reference to the appended drawings. The following embodiments are not intended to limit the matters of the present disclosure, and not all the combinations of the characteristics described in the present embodiments are necessarily required for the means for solving the problems. The same constituents are marked with the same reference numerals, and the descriptions are omitted.

First Embodiment

Hardware Configuration of Printing System

FIG. 1 is a block diagram illustrating a hardware configuration of a printing system in the present embodiment. The printing system includes a host computer 101, and FIG. 1 mainly illustrates a block configuration of the host computer. The host computer 101 is an example of an information processing apparatus. The host computer 101 includes an input interface 110, a CPU 111, a ROM 112, a RAM 113, an external storage device 114, an output interface 115, an input-output interface 116, and a network interface (NETIF) 120. The input interface 110 is connected with an input device such as a keyboard 118 and a pointing device 117, and the output interface 115 is connected with a display device such as a display unit 119. The NETIF 120 performs control to perform data transfer to and from an external device through a network. In the example in FIG. 1, the display unit 119, the pointing device 117, and the keyboard 118 are illustrated as an example of a device different from the host computer 101; however, the display unit 119, the pointing device 117, and the keyboard 118 may be included in the host computer 101. The display unit 119 may be a touch panel display having a function of an input and output device.

The ROM 112 stores an initialization program. The external storage device 114 stores a group of application programs, an operating system (OS), printing data generation software, and other various data. The OS in the descriptions below is an OS of the host computer 101 that is stored in the ROM 112 unless stated otherwise. Hereinafter, the application program is abbreviated to an application. The RAM 113 is used as a working memory or the like in a case of executing various programs stored in the external storage device 114; thus, the various programs are operable in the host computer 101.

In the present embodiment, with the CPU 111 performing processing according to a procedure of the program stored in the ROM 112, the later-described functions and processing of the host computer 101 are executed.

A printing apparatus 102 as an output device is connected with the host computer 101 through the input-output interface 116. In the example in FIG. 1, there is illustrated an example in which the host computer 101 and the printing apparatus 102 are separated from each other; however, the host computer 101 and the printing apparatus 102 may be formed as a single information processing apparatus. As an example of the printing apparatus, an inkjet printer that performs printing by discharging ink onto a paper surface is described; however, printing may be executed by another method (for example, an electrophotographic method). The host computer 101 may be a desktop personal computer, a smartphone, a tablet terminal, or a laptop personal computer. The input-output interface 116 may be wired or wireless. The host computer 101 and the printing apparatus 102 may be connected with each other through a LAN or a WAN such as the Internet.

Configuration of Printing System Focused on Software

Figure 2A:
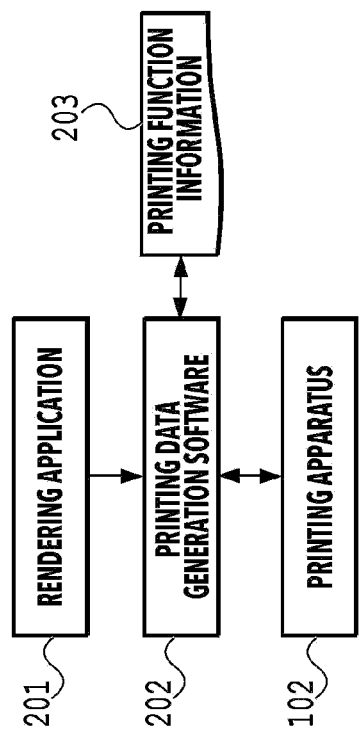
FIGS. 2A and 2B are diagrams schematically illustrating a configuration of the printing system.
Figure 2B:
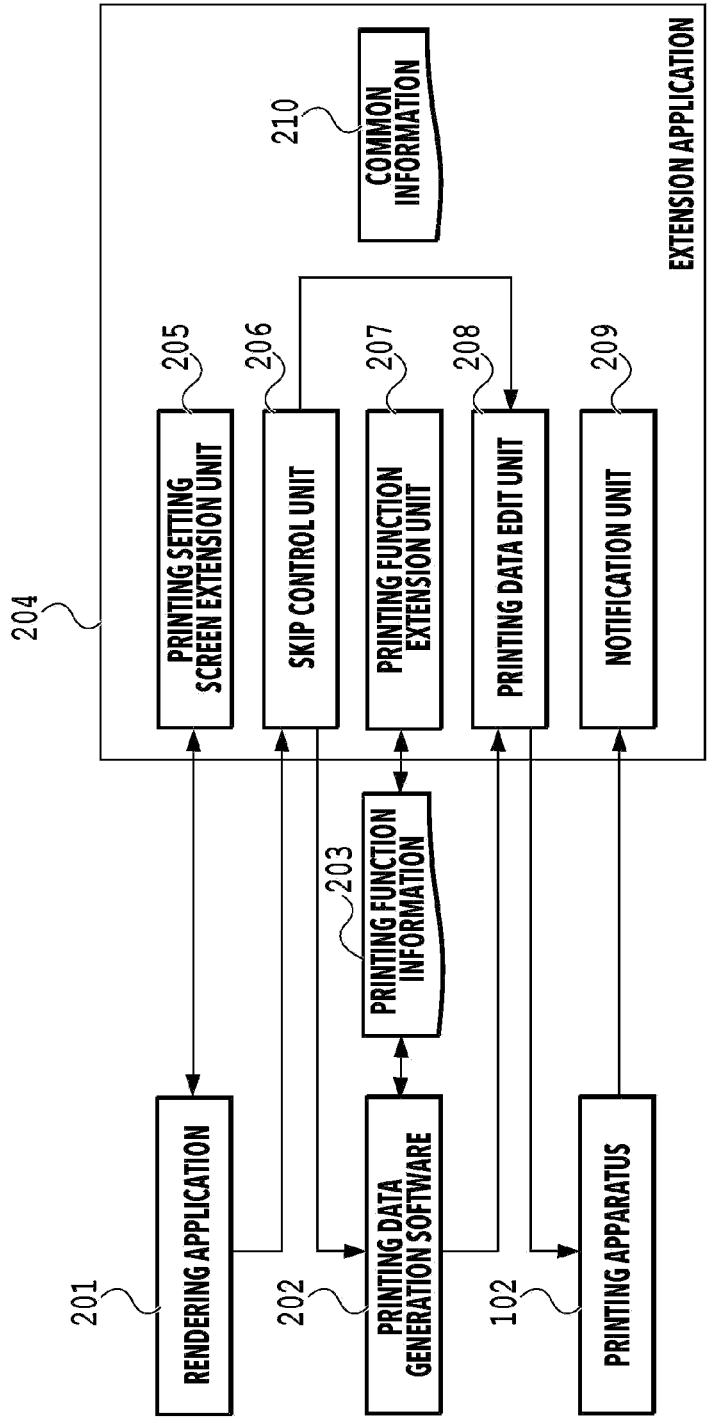

FIGS. 2A and 2B are diagrams schematically illustrating a configuration of the printing system. Here, descriptions are given assuming that the printing system uses the host computer 101 in which Windows (registered trademark) 10 from Microsoft (registered trademark) is installed as the OS. FIG. 2A is a diagram illustrating a general configuration in a case where an extension application 204 is not associated with printing data generation software 202 and the printing apparatus 102. That is, FIG. 2A is a diagram illustrating a configuration of a printing system in which the extension application 204 is not used. On the other hand, FIG. 2B is a diagram illustrating a configuration of the printing system of the present embodiment in which the extension application 204 is associated with the printing data generation software 202 and the printing apparatus 102.

First, an example of the printing system having a general configuration is described with reference to FIG. 2A. The printing system having a general configuration includes a rendering application 201 and the printing data generation software 202. Printing function information 203 is stored in the RAM 113 or the external storage device 114. The rendering application 201 and the printing data generation software 202 are programs operable by the host computer 101 and are stored in the RAM 113 or the external storage device 114.

The rendering application 201 is software that creates contents to be printed (rendering data). An example of the rendering application 201 includes various applications operated by a user such as a document creation application, a spreadsheet application, a data creation application for presentation. Once receiving a printing request by accepting an operation by the user, the rendering application 201 issues a printing instruction to the OS. The printing instruction includes printing setting information for instructing operations of the printing data generation software 202 and the printing apparatus 102. The printing setting information is also referred to as PrintTicket (hereinafter, abbreviated to "PT").

The rendering application 201 can display a printing setting screen to accept a printing setting operation from the user and set the printing setting information (PT). The printing setting screen is a screen provided by either of the printing data generation software 202, the OS, and the rendering application 201. The printing setting screen includes a setting item (hereinafter, also referred to as a "control item") indicating a settable printing function and a control item indicating the setting value. The printing setting screen displays the control item in accordance with capability information (information settable as the printing setting) obtained from the printing data generation software 202. The capability information is also referred to as PrintCapabilities (hereinafter, abbreviated to "PC"). The printing data generation software 202 determines PC based on the printing function information 203.

The printing function information 203 is data indicating all the settable printing functions, setting values thereof, and a printing function in which the exclusive relationship between the setting values is described. The printing function information 203 is also referred to as PrintDeviceCapabilities (PDC). The printing function information 203 is included in a configuration file of the printing data generation software 202 and is arranged in the external storage device 114 as an unchangeable file. Otherwise, the printing function information 203 can also be dynamically generated by the printing data generation software 202. Specifically, the printing data generation software 202 or the OS can be configured to obtain attribute data of the printing apparatus from the printing apparatus 102 and generate the printing function information 203 in accordance with attribute information in the obtained attribute data. In a case where the printing function information 203 is dynamically generated, the generated printing function information 203 is editable. The attribute data of the printing apparatus obtained from the printing apparatus 102 is response data obtained by issuing a Get-Printer-Attributes operation of the IPP to the printing apparatus. The IPP is the Internet Print Protocol. The response includes the attribute information indicating a function that is able to be designated by the printing apparatus 102 (capability of the printing apparatus) and a setting value related to the attribute information. The response data is saved in the RAM 113.

With such a configuration, the printing data generation software 202 can be formed such that the user is able to designate the printing function usable in the corresponding printing apparatus 102 depending on the connected printing apparatus 102. In other words, the printing data generation software 202 can be formed such that the user is able to designate the usable printing function depending on the connected printing apparatus even in a case where a printing apparatus having a different function or a printing apparatus developed by a different vendor is connected. Here is described a configuration of using the IPP Class Driver installed in Windows (registered trademark) 10 as the printing data generation software 202. The IPP Class Driver is a printer driver that executes printing processing in accordance with the specification of a standard printing protocol called the IPP and is software that is bundled with the OS and pre-installed in the host computer 101. The IPP Class Driver is not a specific printer driver that is provided by the vendor of the printing apparatus 102 depending on the model of the printing apparatus 102. The IPP Class Driver is usable in common for multiple printing apparatuses and is a standard class driver provided by the vendor of the OS. The IPP Class Driver obtains the attribute information on the connected printing apparatus 102 and generates the printing function information 203 based on the information such that the user can designate the printing function supported by the connected printing apparatus 102. Thus, the IPP Class Driver as the printing data generation software 202 can dynamically generate the printing function information 203 (PDC).

The printing setting information (PT) designated through the printing setting screen displayed based on PC (Print Capability) based on the printing function information 203 (PDC) as described above is included in the printing instruction outputted from the rendering application 201. In addition to the printing setting information (PT), the printing instruction outputted from the rendering application 201 also includes data that should be rendered.

The OS generates intermediate data (also referred to as input data) based on the printing instruction outputted from the rendering application 201 and passes the intermediate data to the printing data generation software 202. The data outputted by the rendering application 201 for printing is data in the Graphic Device Interface format (data in the GDI format) or data in the XML Paper Specification format (data in the XPS format). In a case where the IPP Class Driver is used as the printing data generation software 202, if the data outputted by the rendering application 201 is data in the GDI format, the OS converts the data format. In other words, the OS converts the data in the GDI format that is outputted from the rendering application 201 into the data in the XPS format. The OS then passes the converted data in the XPS format to the printing data generation software 202 as the intermediate data. On the other hand, if the data outputted by the rendering application 201 is the data in the XPS format, the OS passes the data in the XPS format to the printing data generation software 202 as the intermediate data. The intermediate data includes the rendering data, which is information on an image to be formed on the paper surface, and the printing setting information (PT) set by the user.

The printing data generation software 202 converts the obtained intermediate data into printing data that the printing apparatus 102 is able to construe and transmits the printing data to the printing apparatus 102. The printing data includes the rendering data, which is the information on the image to be formed on the paper surface, and printing setting attribute information (attribute information designating the printing setting), which is generated based on the printing setting information set by the user. The printing setting attribute information includes the attribute information indicating the function that is able to be designated by the printing apparatus 102 (capability of the printing apparatus) and the setting value related to the attribute information.

The printing apparatus 102 performs printing on the paper surface based on the printing data transmitted from the printing data generation software 202. In this process, the printing apparatus 102 forms an image according to the rendering data included in the printing data on the paper surface through an operation in accordance with the printing setting attribute information included in the printing data. The printing setting attribute information includes printing quality (whether to give priority to image quality or to speed, for example), the attribute information and a setting value thereof for designating double-sided printing or the like, and so on. For example, in a case where the printing setting attribute information includes the attribute information designating double-sided printing, the printing apparatus 102 executes double-sided printing.

FIG. 2B is a diagram illustrating a configuration of the present embodiment in a case where the extension application 204 is associated with the printing data generation software 202 and the printing apparatus 102. The configurations and processing that are not particularly mentioned below are equivalent to the configurations and processing in FIG. 2A. In the following descriptions, the processing that is described as being executed by each software included in the host computer 101 is implemented in reality as follows. In other words, the processing is implemented by the CPU 111 developing and executing each software saved in the ROM 112 or the like in the RAM 113.

The extension application 204 is software for extending the function of the printing data generation software 202 and is software that is not the software bundled with the OS and pre-installed in the host computer 101. For this reason, the user downloads the extension application 204 from a server through the Internet and installs into the host computer 101 by operating the host computer 101. Otherwise, based on the connection of the printing apparatus 102 with the host computer 101, the extension application 204 may be automatically installed into the host computer 101. Specifically, in a case where the printing apparatus 102 is connected to the host computer 101, the OS obtains device identification information from the printing apparatus 102. The OS may download the extension application 204 corresponding to the obtained device identification information from the server through the Internet to install into the host computer 101. Thus, the printing data generation software 202 and the extension application 204 are held in the host computer 101 as different files.

The printing data generation software 202 and the extension application 204 may be updated for version upgrades, and the update processing is performed in different timings. A timing in which the printing data generation software 202 is obtained by the host computer 101 and a timing in which the extension application 204 is obtained are different. Also, a trigger with which the printing data generation software 202 is obtained by the host computer 101 and a trigger with which the extension application 204 is obtained are different. In a case where the extension application 204 is installed, the OS associates the extension application 204 with the printing data generation software 202 and the corresponding printing apparatus 102.

The extension application 204 described in the present embodiment includes a printing setting screen extension unit 205, a skip control unit 206, a printing function extension unit 207, a printing data edit unit 208, and a notification unit 209. The extension application 204 also includes common information 210 that is accessible in common from each unit. The extension application 204 is provided by the vendor providing the printing apparatus 102. The reality of the common information 210 is a file saved in the external storage device 114 or information stored on the RAM 113. The extension application 204 performs writing and reading of information to and from the common information 210 by using an Application Program Interface (API) provided by the OS.

The extension application 204 may end the operation every time processing of each unit ends. In this case, the OS activates the extension application 204 every time a request of using each unit is received. A different mode may be considered. For example, although the OS ends the operation of the extension application 204 in a case where processing of the printing setting screen extension unit 205 ends, the OS may keep the extension application 204 working in a case where processing of the skip control unit 206 ends.

Additionally, in the middle of processing of each unit, the extension application 204 may cancel the processing. In a case where the extension application 204 cancels the processing, a job in the middle of processing on a printing queue is deleted by the OS. The printing queue is a spooler included in the OS to store a generated job. The job is generated based on an output of the printing instruction from the extension application 204 and stored in the printing queue. The intermediate data generated based on the output of the printing instruction from the extension application 204 is data associated with the job that is stored in this process. In a case where the intermediate data associated with the job is in the middle of processing, the status of the job is also in the middle of processing. With the printing data, which is obtained by converting the intermediate data associated with the job (in other words, printing data associated with the job), being transmitted to the printing apparatus 102, the job is deleted from the printing queue by the OS.

Once receiving the printing request from the user, the rendering application 201 issues the printing instruction to the OS. As with the configuration in FIG. 2A, the printing instruction includes the printing setting information (PT). As with the configuration in FIG. 2A, the rendering application 201 can display the printing setting screen for designating the printing setting information (PT) under the configuration in FIG. 2B as well. Under the configuration in FIG. 2B, the printing setting screen provided by the extension application 204 is displayed. Specifically, the printing setting screen provided by the printing setting screen extension unit 205 included in the extension application 204 is displayed. In other words, display control of the printing setting screen by the printing setting screen extension unit 205 is performed. Whether the printing setting screen provided by the printing setting screen extension unit 205 is displayed depends on an operation by the user.

Once the rendering application 201 accepts the printing request from the user and the printing instruction is issued to the OS, the OS activates the skip control unit 206. The skip control unit 206 performs processing of controlling whether to perform skip processing for skipping processing of the printing data generation software 202. After the skip control processing (skip determination processing) of the skip control unit 206, the OS generates the intermediate data based on the printing instruction outputted from the rendering application 201 and passes the intermediate data to the printing data generation software 202. In this process, if no skip processing is preformed by the skip control unit 206, the intermediate data is processed by the printing data generation software 202 into the printing data that the printing apparatus 102 is able to construe and passed to the printing data edit unit 208. On the other hand, if the skip processing of the printing data generation software 202 is performed, the intermediate data is passed to the printing data edit unit 208 without being processed by the printing data generation software 202. Thus, it is possible to process the intermediate data by the printing data edit unit 208.

The printing data edit unit 208 edits the intermediate data passed from the printing data generation software 202 or the printing data processed by the printing data generation software 202. For example, as details of the editing, in a case of the layout printing, the printing data edit unit 208 changes the layout of the intermediate data or the printing data based on the printing setting information on the layout printing that is received from the OS. The layout printing is, for example, printing that is performed with data of N pages being laid out on one page, and is called N-in-one, N-up, or the like (N indicates the number of pages). The printing data edit unit 208 is capable of executing a UI display function to display a UI screen on the display unit 119 in response to the reception of the intermediate data or the printing data from the printing data generation software 202 or the skip control unit 206. For example, the printing data edit unit 208 can display a layout result of the intermediate data or the printing data as a preview screen by the UI display function. In the present embodiment, it is possible to display also a guide screen by the UI display function; the details are described later. With the printing data edit unit 208, the printing data is not transmitted to the printing apparatus 102 while the screen is left open, and processing of transmitting the printing data is operated by closing the screen. After the printing data edit unit 208 edits the printing data, the printing data is passed to the printing apparatus 102 by way of the OS. The printing apparatus 102 performs printing on the paper surface based on the received printing data. In a case where the printing data generation software 202 is skipped by the skip control unit 206, the printing data edit unit 208 may convert the received intermediate data into printing data that the printing apparatus 102 is able to construe. In order to convert the intermediate data into the printing data, a function provided by the OS may be used.

The extension application 204 includes the printing function extension unit 207. The printing function extension unit 207 can edit the printing function information 203 (PDC) generated by the printing data generation software 202 or the OS. That is, the printing function extension unit 207 is capable of changing the printing function information 203 even if the printing function information 203 is arranged in the external storage device 114 as an unchangeable file. Thus, the extension application 204 has a function of editing the printing function information 203 (PDC). The printing function extension unit 207 is capable of adding a function provided by the extension application 204. The printing function extension unit 207 can add a function that is supported by the printing apparatus 102 but is not supported by the printing data generation software 202 and can add the exclusive relationship between the setting values of the printing function, for example.

The OS activates the printing function extension unit 207 once the extension application 204 is associated with the printing apparatus 102 and the printing data generation software 202 for the first time. Additionally, the OS may activate the printing function extension unit 207 in another arbitrary timing such as activation of the OS. Thus, in a case where an optional device (for example, a finisher or the like) is added to the printing apparatus 102 later and a function related to the printing is extended, the printing function extension unit 207 can detect the extended function and add the extended function to the printing function information 203.

The extension application 204 includes the notification unit 209. The notification unit 209 is capable of displaying a notification to the user in response to occurrence of an error in the printing apparatus 102. For example, once an error of no paper occurs in the printing apparatus 102, the error is detected by the printing data generation software 202. The OS then displays a message on the display unit 119 by using a notification function called a toast notification that is a function of the OS. With the user pressing the toast notification, the notification unit 209 of the extension application 204 is called by the OS, and a UI screen of the notification unit 209 is displayed. In the UI screen of the notification unit 209, for example, a message indicating details of the error of no paper, a method of loading paper, or the like can be displayed. Pressing includes not only a click operation of a mouse and the like but also a touch or tap operation in a touch panel display.

Once the printing data is transmitted to the printing apparatus 102 and the job associated with the printing data is deleted from the printing queue, the extension application 204 cannot display a screen such as a guide connected with the printing data. In other words, even in the middle of processing of each unit, once the job associated with the printing data is deleted from the printing queue, the extension application 204 cannot display a screen such as the guide connected with the printing data.

The configuration of the extension application 204 for implementing the present embodiment is not limited to that having all the above-described functions (units), and a configuration having only a part of the functions or having another function may be applicable. The extension application 204 may be simply called printing software in some cases. As described above, the extension application 204 includes at least one of the following functions. The functions are a function of displaying the printing setting screen (the printing setting screen extension unit 205) and a function of controlling whether to skip the processing of the printing data generation software 202 (the skip control unit 206). The functions also include a function of editing the printing data to be inputted to the printing apparatus (the printing data edit unit 208) and a function of extending the function that is able to be designated by the printing data generation software 202 (the printing function extension unit 207). The functions also include a function of displaying the screen in response to the occurrence of an error in the printing apparatus 102 (the notification unit 209).

Figure 3:
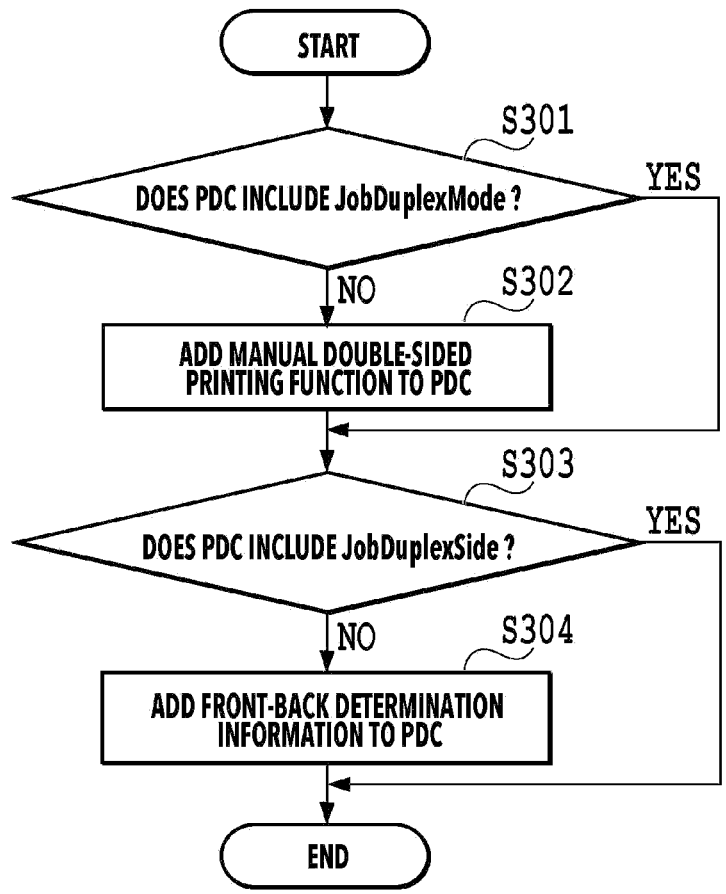
FIG. 3 is a flowchart illustrating an example of edit processing of printing function information.

Edit Processing of Printing Function Information by Printing Function Extension Unit FIG. 3 is a diagram illustrating a main processing flow of edit processing of the printing function information by the printing function extension unit 207 in the present printing system. Hereinafter, the printing function extension unit 207 may be described as a unit having a central role in each processing; however, in reality, a corresponding function is implemented by the CPU 111 executing a corresponding program.

In the present embodiment, the extended function provided by the extension application 204 is described while using a manual double-sided printing function as an example. In other words, here is described an example in which the extension application 204 adds the manual double-sided printing function in a case where the printing apparatus 102 associated with the extension application 204 does not have the manual double-sided printing function. The manual double-sided printing is a printing mode in which, for example, paper including a front surface on which printing is performed by the printing apparatus is manually turned back by the user to perform printing on a back surface of the paper by the printing apparatus again. On the other hand, a mode in which double-sided printing is performed by automatically performing the turn-back operation in the printing apparatus without the manual turn-back by the user is called automatic double-sided printing. The extension application 204 of the present embodiment extends the manual double-sided printing function in the printing apparatus in either cases that the printing apparatus has or does not have the automatic double-sided printing function.

The flow in FIG. 3 is started with the OS activating the printing function extension unit 207 in a timing in which the extension application 204 is associated for the first time, for example. Otherwise, the processing in FIG. 3 may be executed in another arbitrary timing.

In S301, the printing function extension unit 207 determines whether the printing function information 203 (PDC) includes capability information on the manual double-sided printing. Specifically, the printing function extension unit 207 determines whether Feature that is JobDuplexMode and Option connected therewith include Manual. A Feature name and an Option name in PDC and PT used in the following descriptions are merely an example, and a name (information indicating the function) and a settable value other than the above may be applicable.

FIG. 4 is a diagram describing an example of PDC. PDC 401 includes information on a function supported by the printing apparatus 102 (Feature) and information on a setting value in a function (Option). For example, information 402 indicates that it is possible to designate ISOA4 and NorthAmericaLetter as PageMediaSize (paper size). Information 403 indicates that it is possible to designate the following setting value (Option) as JobDuplexAllDocumentsContiguously (double-sided printing function). In other words, the information 403 indicates that it is possible to designate OneSided (one-sided), TwoSidedLongEdge (double-sided long-edge binding), and TwoSidedShortEdge (double-sided short-edge binding). FIG. 4 illustrates an example in which the printing apparatus 102 associated with the extension application 204 supports the double-sided printing function but does not support the manual double-sided printing function.

If it is determined in S301 that PDC includes the capability information on the manual double-sided printing, the printing function extension unit 207 skips processing in S302 and the processing proceeds to S303. In the example in FIG. 4, the PDC 401 does not include JobDuplexMode; accordingly, it is determined in S301 that PDC does not include the capability information on the manual double-sided printing, and the processing proceeds to S302.

In S302, the printing function extension unit 207 adds the manual double-sided printing function to PDC. FIG. 5 illustrates an example of PDC 501 after the edit processing in S302. In the PDC 501, as indicated in information 502, the manual double-sided printing function is indicated by a Feature name that is JobDuplexMode and Option including Auto and Manual indicating settable values of Feature. Those Feature and Option are merely an example, and a name (information indicating the function) and a settable value other than the above may be applicable.

In the present embodiment, here is applied a configuration in which the manual double-sided printing and the automatic double-sided printing are switchable by adding not only Option of Manual but also Option of Auto in a case of indicating the manual double-sided printing function. However, if the switching between the manual double-sided printing and the automatic double-sided printing is unnecessary, a configuration in which only Option of Manual is described may be applicable. In the PDC 501, since the printing apparatus 102 supports the double-sided printing function (automatic), Auto is described as Option. In a case where it is PDC of a printing apparatus that does not support the double-sided printing function, only Option of Manual is added as Option to be added. After S302, the processing proceeds to S303.

In S303, the printing function extension unit 207 determines whether PDC includes front-back determination information in the manual double-sided printing. Specifically, the printing function extension unit 207 determines whether PDC includes Front and Back in Feature that is JobDuplexSide and Option connected with Feature. Feature that is JobDuplexSide is Feature for identifying the front surface and the back surface in the manual double-sided printing. In S303, if it is determined that PDC includes the front-back determination information in the manual double-sided printing, the processing of the present flowchart ends, and if it is determined that PDC does not include the front-back determination information in the manual double-sided printing, the processing proceeds to S304. In the example in FIG. 4, the PDC 401 does not include JobDuplexSide; accordingly, in S303, it is determined that PDC does not include the front-back determination information in the manual double-sided printing.

In S304, the printing function extension unit 207 adds the front-back determination information in the manual double-sided printing to PDC. In the example in FIG. 5, information 503 used for internal processing of the manual double-sided printing function is added to the PDC 501. The information 503 is identification information indicating printing of the front surface and printing of the back surface in the manual double-sided printing and indicates the Feature name that is JobDuplexSide and Option names that are Front and Back.

The information 503 is information used for the internal processing of the manual double-sided function. For this reason, it is preferable to apply a configuration that prevents the information 503 from being designated accidentally by the user and upper software (the rendering application 201). For example, the following configuration is preferable. The PC, which is the capability information generated based on the PDC 501, is able to include a property, DisplayUI, which allows for designation whether to display the concerned function on a UI. Thus, UI display attribute information, which allows for designation whether to display the concerned function on the UI, is added to the PDC 501, and designation is made by the UI display attribute information such that the information 503 is not displayed on the UI. Then, with the DisplayUI property and the UI display attribute information being mapped in a case of generating PC based on the PDC 501, designation is made such that a function of the information 503 is not displayed as information on PC. It is possible to suppress the accidental designation of the information 503 by the user or the upper software with the upper software (the rendering application 201) referring to PC.

With the above processing, Feature and Option are each added as the information on the manual double-sided printing function to PrintCapabilities (PC), which is the capability information generated based on PDC, which is the printing function information 203.

Screen Example Displayed by Printing Setting Screen Extension Unit

Figure 6:
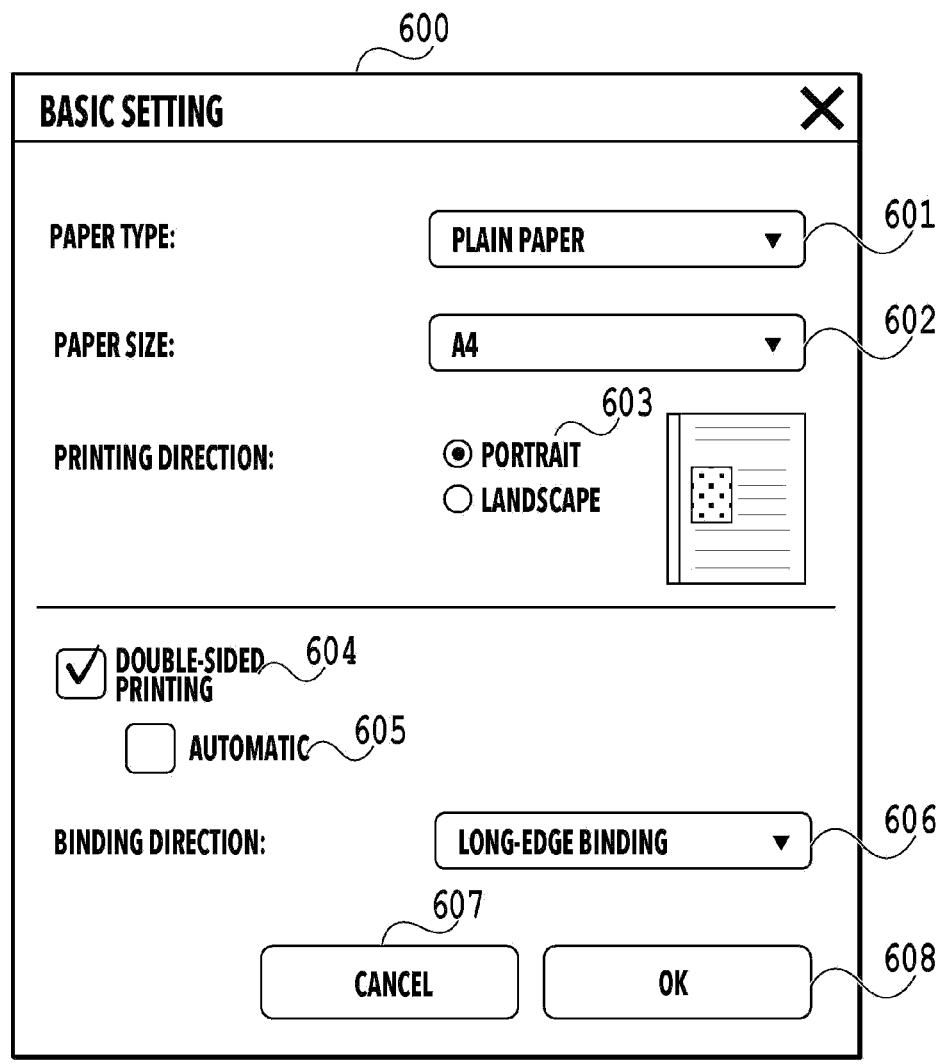
FIG. 6 is a diagram illustrating an example of a printing setting screen.

FIG. 6 is a diagram illustrating an example of the printing setting screen displayed by the printing setting screen extension unit 205. A printing setting screen 600 in FIG. 6 is an example of a screen displayed by the printing setting screen extension unit 205 based on PC generated by the above-described processing. The printing setting screen extension unit 205 is called by the OS in a case where the user instructs display of the printing setting screen on the rendering application 201. Based on PC that can be obtained from the OS, the printing setting screen extension unit 205 displays a screen in which the user is able to designate the printing function that is able to be designated by the printing data generation software 202.

A control item 601 is a control item that allows for setting of the type of the paper used for printing and, for example, it is possible to set an item such as plain paper or photo paper. A control item 602 is a control item that allows for setting of the size of the paper used for printing and, for example, it is possible to set an item such as A4 or letter. A control item 603 is a control item that allows for setting of the direction of printing, and it is possible to set to portrait and landscape. A control item 604 is a control item that allows for switching between enabling and disabling of the double-sided printing. A control item 605 is a control item that allows for switching between enabling and disabling of the automatic double-sided function. A control item 606 is a control item that allows for setting of the binding direction in a case of the double-sided printing and, for example, an item such as long-edge binding and short-edge binding are settable. A control item 607 is a cancel button, and once the control item 607 is instructed, the screen is closed without reflecting the setting. A control item 608 is an OK button, and once the control item 608 is instructed, the screen is closed with reflecting the setting.

In this case, the control item 605 is a control item that is displayed in accordance with PC that is generated based on PDC to which the printing function extension unit 207 adds the information on the manual double-sided printing. The printing setting screen extension unit 205 displays the control item 605 in accordance with Feature that is JobDuplexMode added in PC. The user is able to designate the manual double-sided function by setting check box control of the control item 605 to disabling (in other words, putting no check). The user is able to designate the automatic double-sided function by setting the check box control of the control item 605 to enabling (in other words, putting a check). As described above, the printing apparatus associated with the extension application 204 in the present embodiment supports the automatic double-sided printing function; for this reason, the control item 605 is displayed. If the printing apparatus associated with the extension application 204 does not support the automatic double-sided printing function, the control item 605 is not displayed on the screen that is displayed based on PC indicating the function of the concerned printing apparatus.

The printing setting screen 600 has a configuration in which the setting of enabling and disabling the double-sided printing and the setting of the automatic double-sided printing and the manual double-sided printing are settable by controlling the two check boxes; however, the setting method is not limited thereto. For example, there may be applicable a configuration in which items of disabling of the double-sided printing, enabling of the automatic double-sided printing, and enabling of the manual double-sided printing are provided in a combo box and the setting is performed by single control. Feature that is JobDuplexSide and Option including Front and Back, which are added by the printing function extension unit 207, are used internally by the extension application 204. For this reason, it is preferable that Feature and Option are not included in the printing setting screen so as not to be designated by the user. As described above, the printing setting screen 600 in FIG. 6 is a screen displayed based on PC in which designation is made such that JobDuplexSide is not displayed; accordingly, a control item related to JobDuplexSide is not displayed.

Processing Flow of Manual Double-Sided Function

Next, processing in a case where the manual double-sided printing is designated is described. Once the user sets the manual double-sided printing (sets the automatic double-sided printing to off) on the printing setting screen 600 and instructs printing using a printing queue associated with the extension application 204, the OS calls the skip control unit 206. With the skip control unit 206, it is possible to control whether to skip the processing of the printing data generation software 202. In the present embodiment, an example in which the conversion from the intermediate data into the printing data is performed by the printing data edit unit 208, not the printing data generation software 202, is used for descriptions; however, the intermediate data may be converted by the printing data generation software 202.

In the present embodiment, the skip control unit 206 performs the skip control of the printing data generation software 202. Once the skip control unit 206 ends the processing, the OS passes the intermediate data to the printing data generation software 202. In the present embodiment, here is applied a configuration in which the intermediate data is passed to the printing data generation software 202 regardless of whether the skip processing is performed; however, there may be applicable a configuration in which the OS directly passes the intermediate data to the printing data edit unit 208 in a case where the skip processing is performed. In the present embodiment, the skip control unit 206 does not perform display on the display unit 119.

The intermediate data is passed to the printing data generation software 202, and the processing of the printing data generation software 202 is skipped based on the skip control of the skip control unit 206. Thereafter, the OS passes the intermediate data to the printing data edit unit 208.

Figure 7:
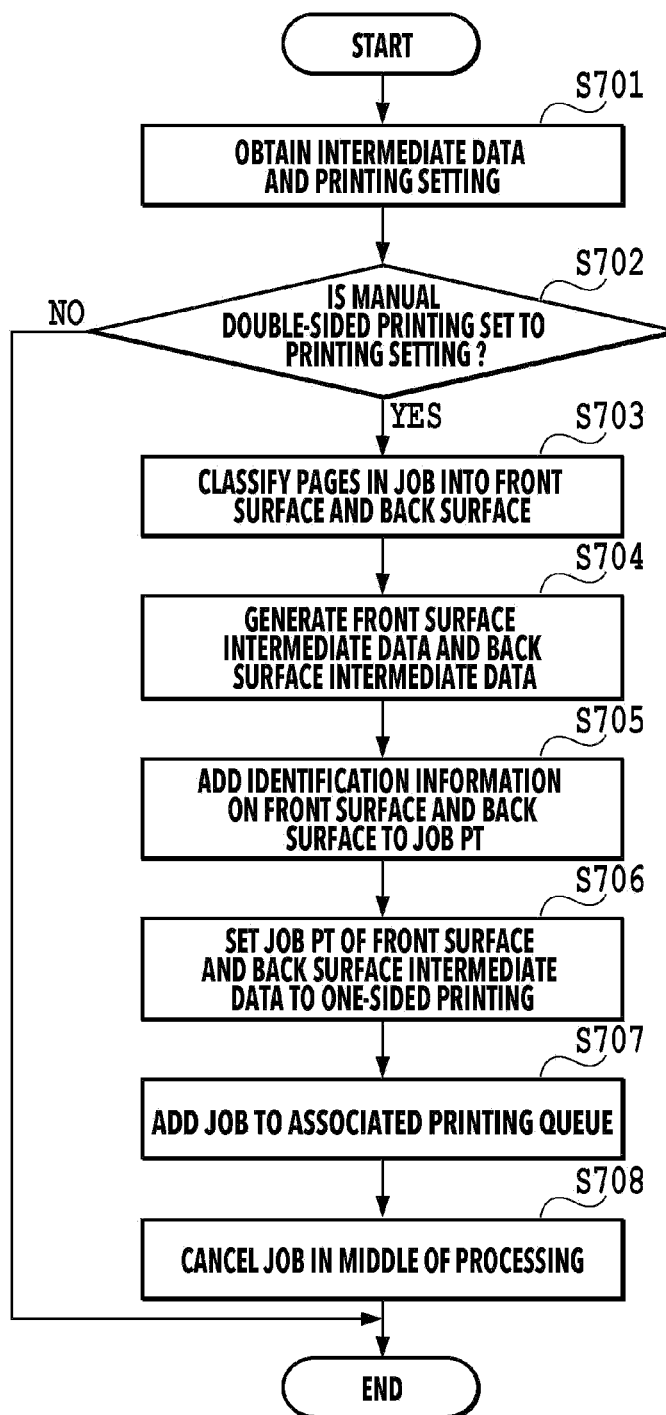
FIG. 7 is a flowchart illustrating an example of printing data edit processing.

FIG. 7 is a diagram illustrating a main processing flow of the printing data edit unit 208 in a case of the manual double-sided setting in the present embodiment. Hereinafter, the printing data edit unit 208 may be described as a unit having a central role in each processing; however, in reality, a corresponding function is implemented by the CPU 111 executing a corresponding program.

First, in S701, the printing data edit unit 208 obtains the intermediate data (input data) received from the printing data generation software 202 and the printing setting (PT) included in the intermediate data. Next, in S702, the printing data edit unit 208 determines whether the manual double-sided printing is set in the printing setting obtained in S701. For example, in a case where the check box control of the control item 605 is set to disabling in the printing setting screen 600 in FIG. 6, PT in which the manual double-sided printing is set is obtained. In a case where the manual double-sided printing is not set, the printing data edit unit 208 withdraws from the present processing flow without performing the processing related to the manual double-sided printing. On the other hand, in a case where the manual double-sided printing is set, the processing by the printing data edit unit 208 proceeds to S703 to perform the processing related to the manual double-sided printing.

In S703, based on the printing setting obtained in S701, the printing data edit unit 208 classifies a page to be arranged on the front surface and a page to be arranged on the back surface in a case of the double-sided printing out of pages included in the intermediate data (job). In a case where the pages of the intermediate data are divided to be passed to the printing data edit unit 208, the classification processing in S703 is performed after waiting until all the pages are passed to the printing data edit unit 208.

Figure 8:
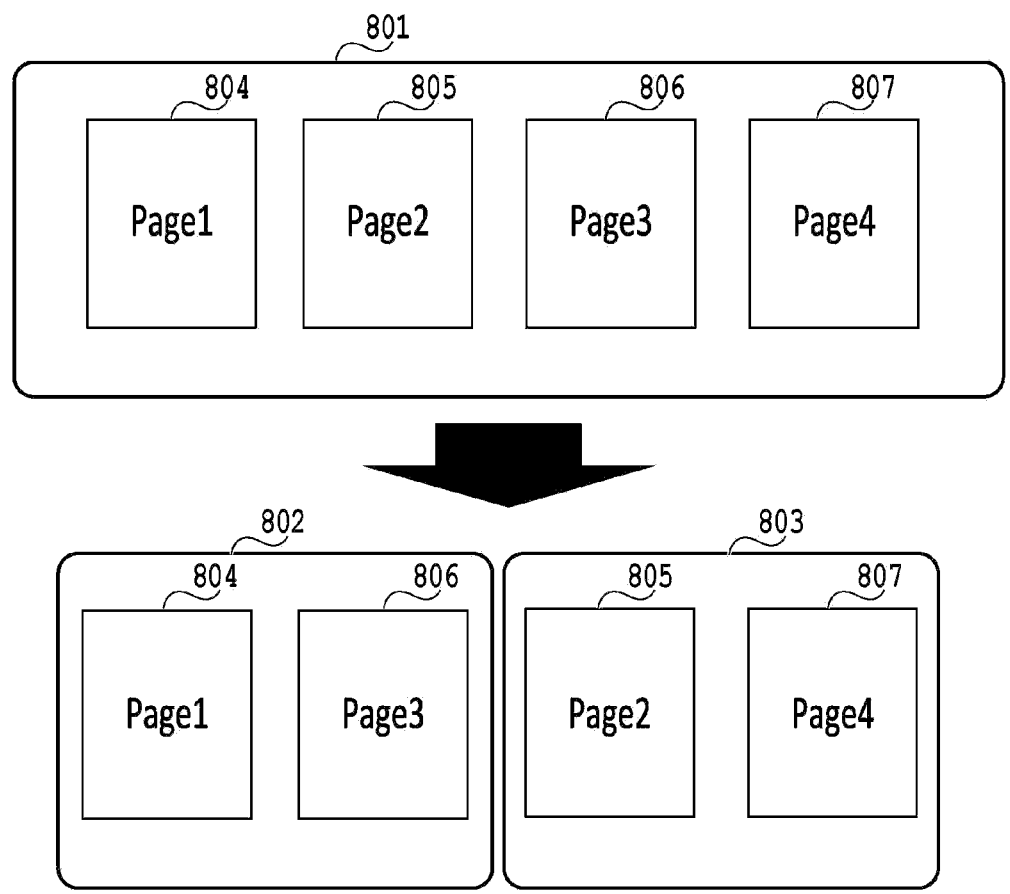
FIG. 8 is an explanatory view of pages arranged on a front surface and a back surface in a case of double-sided printing.

FIG. 8 is an explanatory view of a method of classifying a page to be arranged on the front surface and a page to be arranged on the back surface in a case of the double-sided printing. FIG. 8 illustrates an example of a case where the printing setting is long-edge binding and the intermediate data has four pages. In the present embodiment, descriptions are given while the binding direction settable in a case of the double-sided printing is limited to long-edge left binding and short-edge top binding; however, PDC and the printing setting screen 600 may be configured such that the binding direction is settable to right, left, top, and bottom on the printing setting screen 600. In this case, in S702, the classification and the order of the pages may be changed in accordance with the setting value of the binding direction. In a case where the extension application 204 is associated with a printing apparatus that does not support the automatic double-sided printing, information indicating the binding direction that corresponds to the information 403 in FIG. 4 is added to PDC by the printing function extension unit 207.

A group 801 in FIG. 8 indicates a page group and the order of pages of the intermediate data before the classification. In the group 801, the pages of the intermediate data are stored in the order of pages 804, 805, 806, and 807 (in FIG. 8, Page 1 indicates that it is the first page). Once the pages are classified such that the group 801 is bound in the long-edge binding in the left binding direction, the pages are classified into a group 802 arranged on the front surface page and a group 803 arranged on the back surface page in a case of the double-sided printing. The group 802 is arranged in the order of the pages 804 and 806 (the order of Page 1 and Page 3), and the group 803 is arranged in the order of the pages 805 and 807 (the order of Page 2 and Page 4).

Next, in S704, the printing data edit unit 208 generates front surface intermediate data and back surface intermediate data from the intermediate data based on the page classification in S703. In a case of the example in FIG. 8, the front surface intermediate data includes the pages of the group 802, and the back surface intermediate data includes the pages of the group 803. In other words, first divided input data including the pages of the group 802 and second divided input data including the pages of the group 803 are generated. Thus, with the intermediate data being divided into the front surface intermediate data and the back surface intermediate data, as described later, it is possible to display a guide screen by the extension application 204 in a timing as needed. Once the printing data is transmitted to the printing apparatus 102 from the extension application 204 (the printing data edit unit 208) through the OS, the display control cannot be performed by the extension application 204 in a proper timing. In the present embodiment, in a case where the front surface intermediate data and the back surface intermediate data are generated from the intermediate data and the extension application 204 subsequently performs processing of the back surface intermediate data after finishing processing of the front surface intermediate data, it is possible to properly display the guide screen. The details are described later. In S704, the printing setting (PT) included in the intermediate data is copied and is added to each of the front surface intermediate data and the back surface intermediate data as the printing setting. In this case, the setting of the manual double-sided printing is not added.

In S705, the printing data edit unit 208 adds the front-back determination information to the printing setting (PT) included in the front surface intermediate data and the back surface intermediate data generated in S704. In other words, identification information on the front surface or the back surface is added. Specifically, Option of JobDuplexSide is set to Front for PT of the front surface intermediate data, and Option of JobDuplexSide is set to Back for PT of the back surface intermediate data. With the identification information on the front surface and the back surface being added, it is possible to perform control taking into consideration an interruption of another printing job during the processing of the front surface intermediate data and the processing of the back surface intermediate data. The details are described later with reference to FIG. 12. It is also possible to skip the processing of setting Option of JobDuplexSide to Front for PT of a front surface job by setting Option to Front as default during the addition of the information 503 in FIG. 5.

Next, in S706, the printing data edit unit 208 sets the printing setting included in the front surface intermediate data and the back surface intermediate data to the one-sided printing. Specifically, Option in Feature of JobDuplexAllDocumentsContiguously in the printing setting is set to OneSided. Thus, the front surface intermediate data and the back surface intermediate data are printed in one-sided by the printing apparatus 102. It is possible to implement the manual double-sided printing function by the user turning back the paper after the printing of the front surface intermediate data in one-sided, and then the back surface intermediate data is printed on the paper in one-sided.

Next, in S707, the printing data edit unit 208 identifies the printing queue to which the job to which the manual double-sided printing is set is added. The printing data edit unit 208 then adds the front surface intermediate data and the back surface intermediate data generated in S704 to the obtained printing queue as a job for performing printing in the order of the front surface intermediate data and the back surface intermediate data. With the job addition, the front surface intermediate data is added as a front surface job and the back surface intermediate data is added as a back surface job to the printing queue. In the processing in FIG. 7, the processing of adding the front surface intermediate data and the back surface intermediate data from the intermediate data to the printing queue as a job nearly at the same time is performed in S707. Thus, it is possible to reduce the possibility that another job interrupts between the job of the front surface intermediate data and the job of the back surface intermediate data.

Next, in S708, the printing data edit unit 208 performs cancel processing of a job formed of the pages of the group 801 and withdraws from the processing flow. With a cancel instruction in S708, the canceled job is deleted by the OS, and the processing of the extension application 204 on the job formed of the group 801 ends.

After the flow of the processing in FIG. 7 ends firstly as described above, as a processing step of the next manual double-sided function, the printing data edit unit 208 subsequently performs processing on the front surface job and the back surface job added in S707.

First, processing on the front surface job that is added as a job in S707 is described. Once the job in the middle of processing is canceled in S708, the processing of the front surface job added in S707 is started, and processing of each unit of the extension application 204 is called. First, the skip control unit 206 is called by the OS. In the present embodiment, the intermediate data is not converted by the printing data generation software 202; for this reason, the skip control unit 206 performs the skip control of the printing data generation software 202. After the processing of the skip control unit 206, the intermediate data is passed to the printing data edit unit 208 without the processing by the printing data generation software 202.

Figure 9:
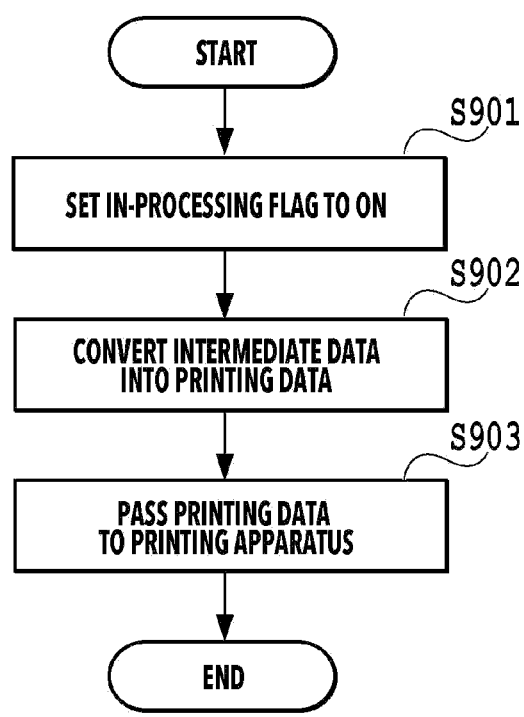
FIG. 9 is a flowchart illustrating an example of printing data edit processing of a front surface job.

FIG. 9 is a diagram illustrating a main processing flow in a case where the printing data edit unit 208 performs the processing of the front surface job added in S707. After obtaining the intermediate data, the printing data edit unit 208 executes the processing flow in FIG. 9. In reality, determination on whether the accepted intermediate data is the front surface job is made, and if it is determined that the accepted intermediate data is the front surface job, the processing flow in FIG. 9 is executed. The determination about the front surface job is described later in FIG. 12.

First, in S901, the printing data edit unit 208 sets an in-processing flag indicating that the processing of the front surface is performed to ON and stores the in-processing flag into the common information 210. In the present embodiment, the front surface page and the back surface page are stored in the printing queue as different printing jobs. For this reason, there may be considered a possibility that another job interrupts between the front surface job and the back surface job. With the in-processing flag being stored, it is possible to perform exception control for a case where the back surface job is not processed immediately after the processing of the front surface job. Taking into consideration a case where there are multiple printing queues associated with the extension application 204, it is preferable that the in-processing flag is managed for each printing queue.

Next, in S902, the printing data edit unit 208 converts the intermediate data of the front surface job into printing data that the printing apparatus 102 is able to construe. Additionally, in S903, the printing data edit unit 208 passes the printing data converted in S902 that includes the front surface page to the printing apparatus 102 through the OS. Thereafter, the printing apparatus 102 prints the front surface page.

Next, the processing of the back surface job that is added as a job by the extension application 204 in S707 is described. As described above, the extension application 204 performs the job addition in the order of the front surface job and the back surface job. Thus, once the processing of the front surface job is completed, the extension application 204 starts the processing of the back surface job added to the printing queue. First, the intermediate data is passed to the skip control unit 206 by the OS. As with the case of the processing of the front surface job, the skip control unit 206 performs the skip control of the printing data generation software 202. Next, the intermediate data is passed to the printing data generation software 202, and the processing is skipped based on the control of the skip control unit 206. Thereafter, the intermediate data is passed to the printing data edit unit 208, and the printing data edit unit 208 performs the processing on the back surface job.

Figure 10:
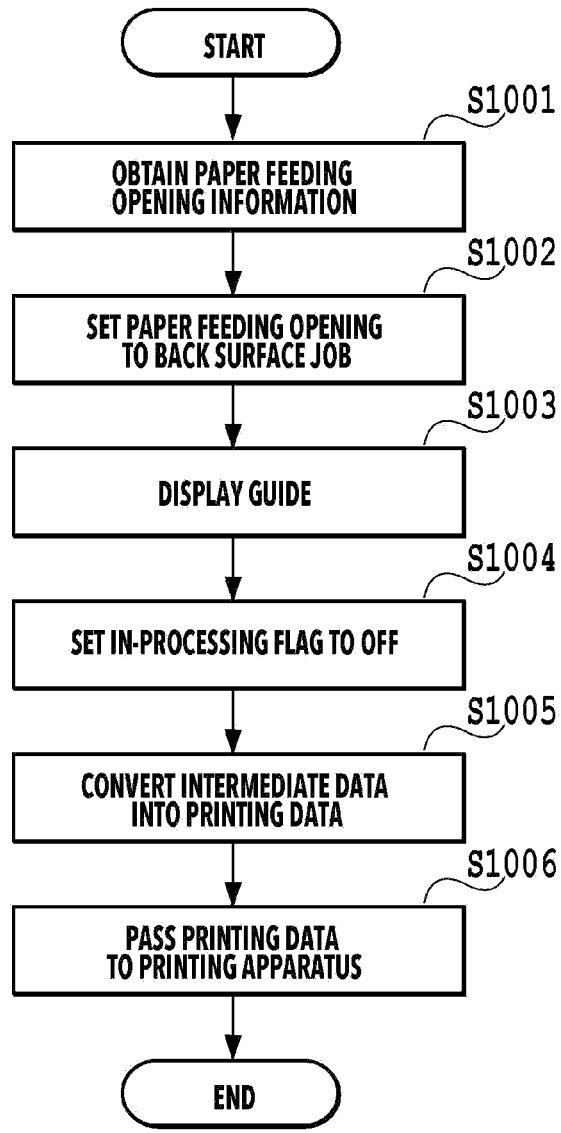
FIG. 10 is a flowchart illustrating an example of printing data edit processing of a back surface job.

FIG. 10 is a diagram illustrating a main processing flow in a case where the printing data edit unit 208 performs the processing of the back surface job added in S707. After obtaining the intermediate data, the printing data edit unit 208 executes the processing flow in FIG. 10. In reality, determination on whether the accepted intermediate data is the back surface job is made, and only if it is determined that the accepted intermediate data is the back surface job, the processing flow in FIG. 10 is executed. The determination about the back surface job is described later in FIG. 12.

First, in S1001, the printing data edit unit 208 obtains information on a paper feeding opening included in the printing apparatus 102 from the capability information (PC) based on the printing setting (PT) included in the intermediate data. As the paper feeding opening, for example, a cassette, a rear tray, or the like may be included. The printing data edit unit 208 obtains the capability information (PC) based on the printing setting (PT) from the printing data generation software 202 and performs processing. Next, in S1002, the printing data edit unit 208 performs setting of the paper feeding opening to the printing setting (PT) included in the intermediate data of the back surface job. Based on the paper feeding opening information obtained in S1001, the printing data edit unit 208 sets a paper feeding opening that is settable to the printing apparatus 102. In general, for the printing apparatus, the available paper feeding opening is different depending on the paper size or the paper type onto which the printing is performed. Based on the printing setting of the paper size, the paper type, or the like set to PT, the printing data edit unit 208 obtains as PC a paper feeding opening that allows for the printing out of paper feeding openings included in the printing apparatus 102 in a timing in which PC corresponding to PT is obtained in S1001. If there is only one candidate of the paper feeding opening at this point, this one paper feeding opening is determined to be set in S1002. On the other hand, if there are multiple candidates of the paper feeding opening at this point, the printing data edit unit 208 may hold in advance a table in which the setting priority order of the paper feeding openings is determined, and the setting of the paper feeding opening may be performed in accordance with the table.

Next, in S1003, the printing data edit unit 208 displays a guide screen indicating procedure to set paper.

Figure 11:
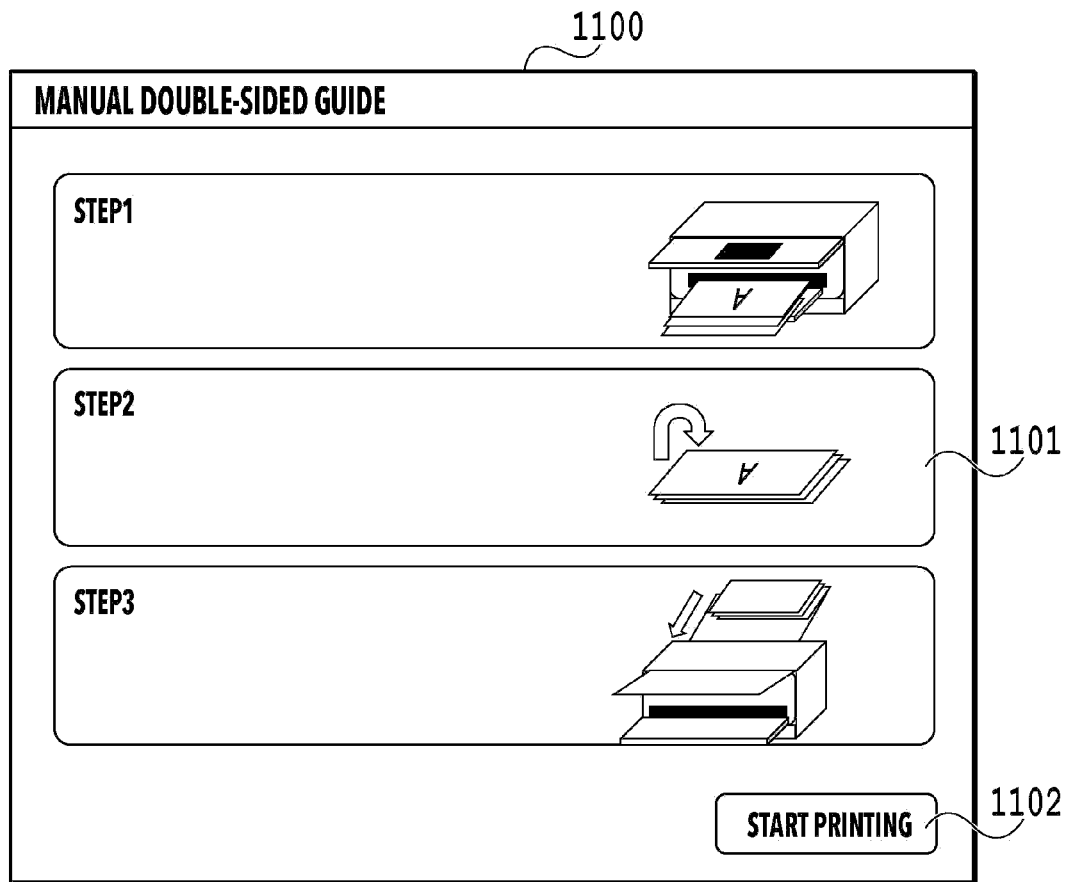
FIG. 11 is a diagram illustrating an example of a guide related to manual double-sided printing.

FIG. 11 is a diagram illustrating an example of a guide related to the manual double-sided printing. A guide screen 1100 includes paper setting procedure 1101 and a printing start button 1102. The paper setting procedure 1101 is a guide related to a method of setting paper to the paper feeding opening after the front surface page is ejected. The printing data edit unit 208 displays the paper setting procedure 1101 that matches the paper feeding opening set in S1002. For example, in a case where the rear tray is set in S1002, the paper setting procedure 1101 about procedure to set paper to the rear tray is displayed. In a case where only the cassette is mounted in the printing apparatus 102 as the paper feeding opening, the cassette is set in S1002, and procedure to set paper to the cassette of the printing apparatus 102 is displayed in the paper setting procedure 1101. The printing start button 1102 is a control item for the user to instruct starting of the printing of the back surface job, and once the button is pressed, the printing data edit unit 208 closes the guide screen 1100 and processing in and after S1004 continues.

The guide screen 1100 illustrated in FIG. 11 is an example and may have a different form. For example, while the front surface page is processed by the printing apparatus 102, the printing data edit unit 208 may obtain a state of the printing apparatus 102 by issuing a Get-Printer-Attributes operation of the IPP to the printing apparatus 102. In this case, the guide screen may be configured to make a screen transition in accordance with the obtained status. For example, a message indicating that it is in the middle of printing may be displayed during the printing, and the screen may be switched to display the paper setting procedure after the printing is completed. For example, a preview screen of the layout result of the intermediate data or the printing data may be displayed based on a trigger of the guide screen display. The order of display is not particularly limited. The preview screen may be displayed after the guide screen is displayed, or the guide screen may be displayed after the preview screen is displayed.

Referring back to FIG. 10 and the description is continued. In S1004, the printing data edit unit 208 sets the in-processing flag, which is stored to the common information 210 in S901, to OFF (deletes the flag). Thus, it is possible to determine whether the front surface job and the back surface job are processed continuously by setting the in-processing flag to ON during the processing of the front surface job and setting the in-processing flag to OFF after the processing of the back surface job. Error processing using the determination is described later with reference to FIG. 12.

Next, in S1005, the printing data edit unit 208 converts the intermediate data into printing data that the printing apparatus 102 is able to construe. In S1006, the printing data edit unit 208 passes the printing data converted in S1005 to the printing apparatus 102 through the OS, and thus the back surface page is printed by the printing apparatus 102.

As described above, in a case where the extension application 204 accepts the manual double-sided printing setting, the job addition to the printing queue is performed such that the front surface page and the back surface page are different jobs. Thus, it is possible to perform the processing on each of the front surface page and the back surface page in the processing flow of the extension application 204. In other words, it is possible to display a UI such as the guide screen in a processing timing of each of the front surface page and the back surface page. Thus, it is possible to display a screen like the paper setting guide after the front surface page is passed to the printing apparatus 102 in a case of the manual double-sided printing.

In the present embodiment, here is described an example in which the two jobs, the front surface job and the back surface job, are generated and added. This is because the possibility that another job interrupts between the processing of the front surface and the processing of the back surface is reduced by adding the front surface job and the back surface job continuously. However, it is also possible to provide the manual double-sided function with another mode. For example, in S703, after the printing data edit unit 208 performs the classification into the front surface page and the back surface page, only the back surface job formed of the back surface page may be generated to perform the job addition. In this case, after the job addition of only the back surface job, processing of S901 to S903 may be performed by the printing data edit unit 208 on the front surface page, and thus it is possible to provide the manual double-sided function and display the guide without generating the job of the front surface page.

Subsequently, determination on whether to execute each processing in FIGS. 7, 9, and 10 and a determination flow of the error processing are described with reference to FIG. 12. In the present embodiment, based on the identification information on the front surface and the back surface (front-back determination information) included in the printing setting of the intermediate data and the in-processing flag added in S901, which of the processing of FIGS. 7, 9, and 10 is executed by the printing data edit unit 208 is switched. In the present embodiment, a job is divided into the front surface job and the back surface job to perform a series of processing. For this reason, in a case where another job is added as an interruption between the front surface job and the back surface job, the manual double-sided printing cannot be performed normally. To deal with this, the error processing is performed by using the identification information on the front surface and the back surface and the in-processing flag.

Figure 12:
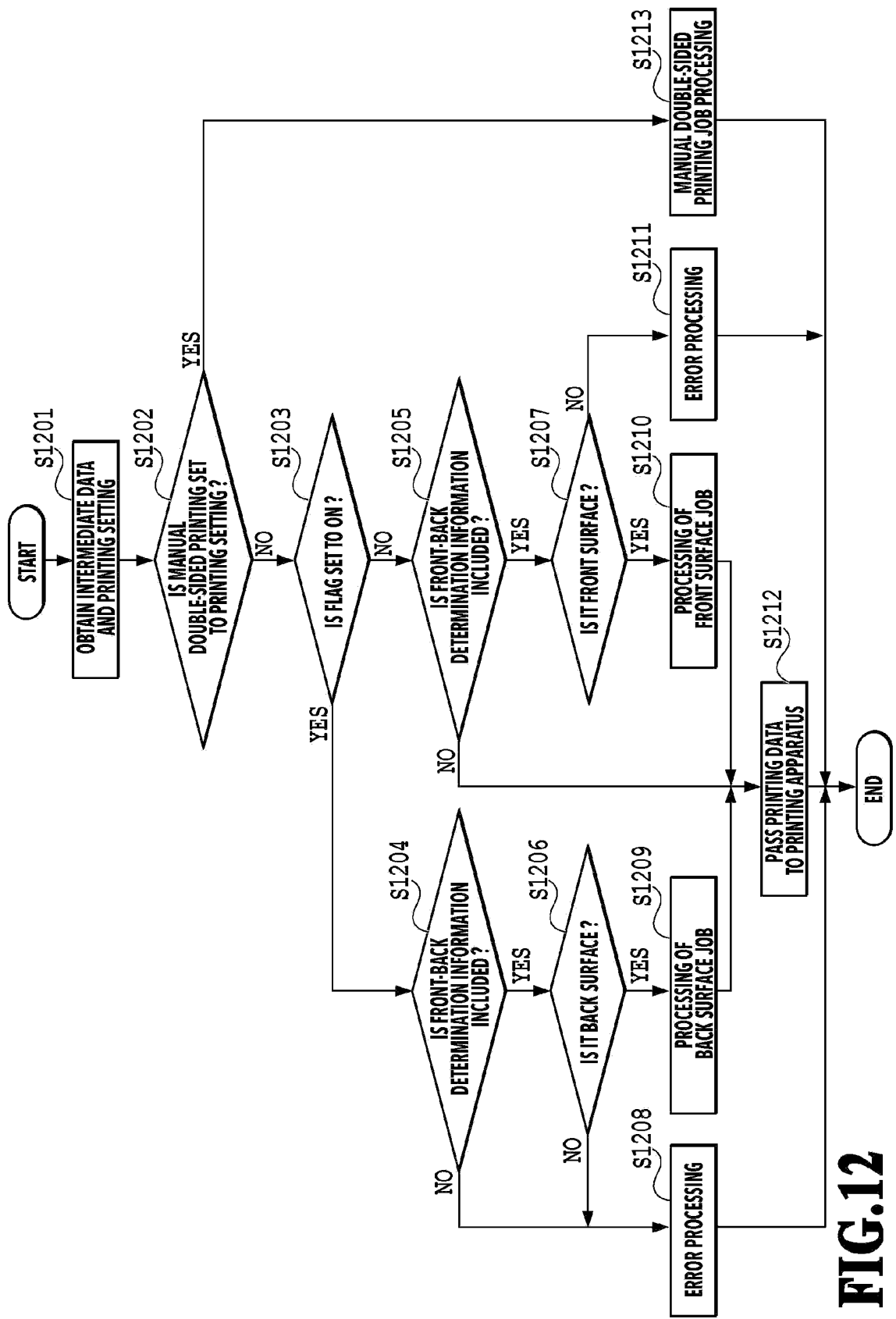
FIG. 12 is a flowchart illustrating an example of the printing data edit processing.

FIG. 12 indicates a processing flow including the above-described determination on switching of processing to be executed and error determination in the printing data edit unit 208. In other words, processing in FIG. 12 is processing that is performed in the printing data edit unit 208 in advance of each processing in FIGS. 7, 9, and 10.

In S1201, the printing data edit unit 208 obtains the intermediate data and the printing setting. Next, in S1202, the printing data edit unit 208 determines whether the manual double-sided printing is set to the printing setting obtained in S1201. If the manual double-sided printing is not set, the processing by the printing data edit unit 208 proceeds to S1203. On the other hand, if the manual double-sided printing is set, the processing proceeds to S1213.

In S1213, the printing data edit unit 208 executes the processing on the manual double-sided printing job and withdraws from the present processing flow. The processing in S1213 is similar to the processing flow of S703 to S708 in FIG. 7.

In S1203, the printing data edit unit 208 determines whether the in-processing flag set in S901 is ON. If the in-processing flag is ON, or in other words, if the processing of the front surface job is performed and also the corresponding back surface job is not processed yet, the processing proceeds to S1204. On the other hand, if the in-processing flag is not stored, or in other words, if the processing of the front surface job is not performed, the processing proceeds to S1205.

In S1204, the printing data edit unit 208 determines whether the printing setting obtained in S1201 includes the identification information on the front surface and the back surface (front-back determination information). If the front-back determination information is not included, or in other words, if the job is not the front surface job or the back surface job added to the printing queue by the extension application 204, the processing proceeds to S1208. On the other hand, if the front-back determination information is included, or in other words, if the job is either of the front surface job and the back surface job, the processing proceeds to S1206.

In S1206, the printing data edit unit 208 determines whether the front-back determination information included in the printing setting is the back surface. If the front-back determination information is not the back surface, or in other words, if the front-back determination information is the front surface, the processing proceeds to S1208. If the front-back determination information is the back surface, the processing proceeds to S1209. The condition to proceed to the processing in S1209 is a case where the processing of the front surface job is performed and also the job in the middle of processing is the back surface job including the identification information on the back surface. In S1209, the printing data edit unit 208 performs the processing of the back surface job. The processing in S1209 is similar to the processing of S1001 to S1005 in FIG. 10. After S1209, the processing proceeds to S1212.

On the other hand, the condition to proceed to the processing in S1208 is a case where the processing of the front surface job is performed but the job in the middle of processing is not the back surface job. In S1208, the printing data edit unit 208 performs the later-described error processing and withdraws from the present processing flow.

In S1205, the printing data edit unit 208 determines whether the printing setting of the job includes the front-back determination information. If the front-back determination information is not included, or in other words, if the job is not the front surface job or the back surface job, the processing proceeds to S1212. A case where the processing proceeds from S1205 to S1212 is a case where the manual double-sided printing is not set and also a general job that is not the front surface job or the back surface job added by the processing of the printing data edit unit 208 is processed. Thus, the processing for the manual double-sided printing is not performed.

In S1205, in a case where the printing data included in the intermediate data includes the front-back determination information, or in other words, in a case where the job is either of the front surface job and the back surface job, the processing proceeds to S1207. In S1207, the printing data edit unit 208 determines whether the front-back determination information included in the printing setting is the front surface. If the front-back determination information is the front surface, the processing proceeds to S1210, and if the front-back determination information is not the front surface, the processing proceeds to S1211.

The condition to proceed to the processing in S1210 is a case where the processing of the front surface job is not performed and the job in the middle of processing is the front surface job. Accordingly, in S1210, the printing data edit unit 208 performs the processing of the front surface job. The processing in S1210 is similar to the processing in S901 to S902 in FIG. 9. Thereafter, the processing proceeds to S1212. In the processing in S1210, the printing data edit unit 208 may display the layout result of the intermediate data or the printing data corresponding to the front surface job as the preview screen by the UI display function.

On the other hand, the condition to proceed to the processing in S1211 is a case where the processing of the front surface job is not performed previously and the job in the middle of processing is the back surface job. In S1211, the printing data edit unit 208 performs the later-described error processing and withdraws from the present processing flow.

In S1212, the printing data edit unit 208 passes the intermediate data to the printing apparatus through the OS and withdraws from the processing of the present flow.

Figure 13:
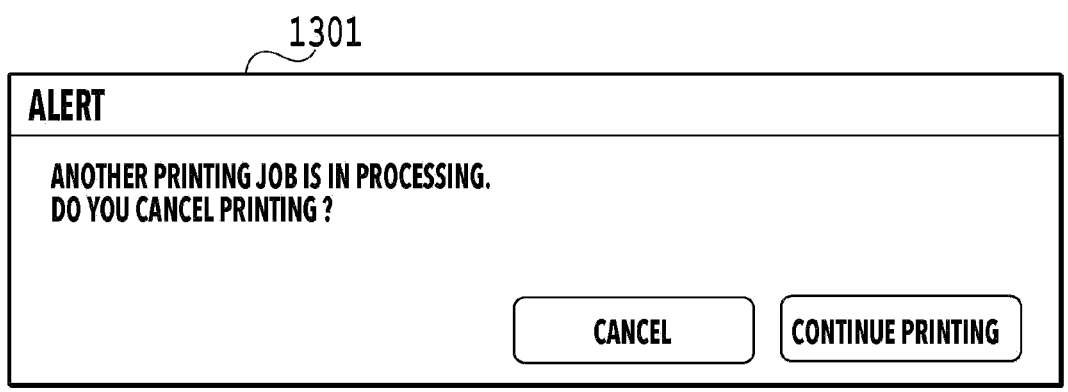
FIG. 13 is a diagram illustrating an example of an error dialogue.

FIG. 13 is a diagram illustrating an example of an error dialogue displayed as an example of the error processing of the present embodiment. The error processing in S1208 and S1211 is described with reference to FIG. 13. There may be considered multiple methods as a method of the error processing. For example, in S1208, since the front surface job processing is already performed, the printing data edit unit 208 may display a screen that is able to instruct whether to cancel the job in the middle of processing or continue the printing by displaying a message like an alert message 1301. If a cancel instruction is accepted, the job in the middle of processing is canceled, and if the printing is continued, the job in the middle of processing is printed.

As another error processing method, control of the job processing order using the job addition may be performed.

In S1208, the extension application 204 detects the job of the printing queue associated with the extension application 204 itself. If there is the job, the extension application 204 adds the job in the middle of processing again to the printing queue and also cancels the job in the middle of processing; in this way, it is possible to change the job processing order. Thus, a configuration to wait until the job of the back surface becomes the processing target may be applicable. In a case where the job of the back surface is not processed within a certain period of time or within a certain number of job processing, the processing of setting the in-processing flag to OFF may be added so as not to keep waiting the back surface job.

On the other hand, the case in S1211 is a state in which the back surface job is in the middle of processing despite that the front surface job is not processed in the prior processing. As the error processing method, for example, there may be considered a configuration in which the printing data edit unit 208 displays a screen like the alert message 1301 in FIG. 13 so as to be able to cancel the back surface job in the middle of processing as with S1208.

With the above-described error processing being performed, it is possible to suppress occurrence of a wrong printing result because of a failure in the continuous printing of the front surface job and the back surface job that are divided by the manual double-sided printing processing.

As described above, it is possible to extend the manual double-sided printing function by the extension application in the printing system in the present embodiment. In a case of the configuration like the extension application 204 described in the present embodiment, if the printing data is once transmitted to the printing apparatus, the extension application 204 cannot display the guide or the like in the middle of processing. In the printing system of the present embodiment, with the printing job being divided to add the job again, it is possible to display the screen such as the guide on the display unit in a timing of each of the divided printing jobs. According to the present embodiment, even in a case where the manual double-sided printing function is not provided on the side of the printing apparatus 102, it is possible to provide the manual double-sided function. Therefore, the extension application can provide a better function.

Second Embodiment

In the first embodiment, there is described an example in which the paper setting guide of the manual double-sided printing is displayed on the extension application side (host computer side). In the present embodiment, here is described an example in which the paper setting guide of the manual double-sided printing is displayed on the printing apparatus side. On the extension application side, a guide screen is displayed for purpose of notifying the user in advance of that the paper setting guide is to be displayed on the printing apparatus side. Hereinafter, a configuration and processing that are not mentioned in the descriptions are equivalent to the example described in the first embodiment; for this reason, the descriptions are omitted.

Figure 14:
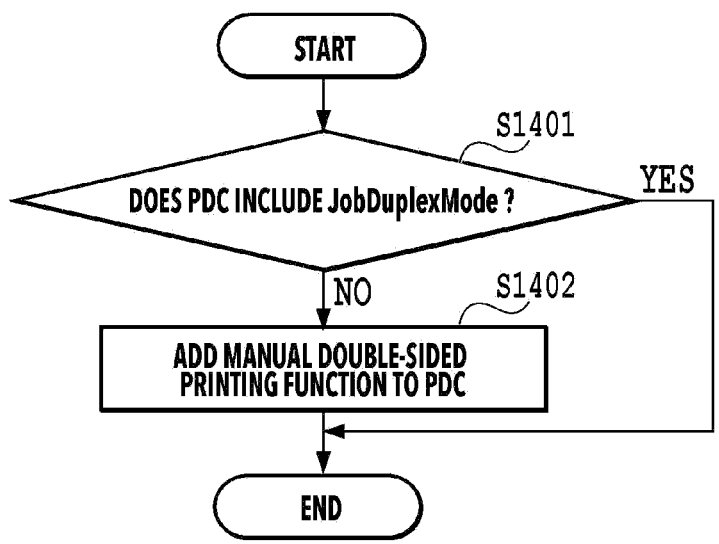
FIG. 14 is a flowchart illustrating an example of the edit processing of the printing function information.

Edit Processing of Printing Function Information by Printing Function Extension Unit FIG. 14 is a diagram illustrating a main processing flow out of the edit processing of the printing function information by the printing function extension unit 207 in the printing system in a second embodiment. Hereinafter, the printing function extension unit 207 may be described as a unit having a central role in each processing; however, in reality, a corresponding function is implemented by the CPU 111 executing a corresponding program.

FIG. 15 is a diagram illustrating an example of PDC edited by the processing in FIG. 14. The flow in FIG. 14 is started with the OS activating the printing function extension unit 207 in a timing in which the extension application 204 is associated for the first time, for example. In other words, the flow in FIG. 14 is executed in a similar timing as the example described in FIG. 3.

In S1401, the printing function extension unit 207 determines whether PDC includes the capability information on the manual double-sided printing. Specifically, the printing function extension unit 207 determines whether Feature that is JobDuplexMode and Option connected therewith include Manual. If it is determined that PDC includes the capability information on the manual double-sided printing in S1401, the printing function extension unit 207 withdraws from the processing flow. If it is determined that PDC does not include the capability information on the manual double-sided printing in S1401, the processing proceeds to S1402.

In S1402, the printing function extension unit 207 adds the manual double-sided printing function to PDC. In PDC 1501 in FIG. 15, the manual double-sided function is indicated in information 1502 by the Feature name that is JobDuplexMode and Option including Auto and Manual indicating settable values of Feature.

With the above-described processing, each Feature is added as information related to the manual double-sided printing function in the present embodiment to PrintCapabilities (PC) that is the capability information generated based on PDC that is the printing function information 203. In the present embodiment, the identification information indicating the printing of the front surface and the printing of the back surface in the manual double-sided printing as described in the first embodiment is not added to PDC.

Processing Flow of Manual Double-Sided Printing Function

Next, a processing flow of the manual double-sided printing is described. Once the user performs setting of the manual double-sided printing (sets the automatic double-sided printing to off) on the printing setting screen 600 and performs printing in response to the printing queue connected with the extension application 204, the OS calls the skip control unit 206. The present embodiment is described with a configuration in which the skip control unit 206 performs the skip control and the printing data edit unit 208 converts the intermediate data into the printing data that the printing apparatus 102 is able to construe; however, it is not limited thereto. For example, a configuration in which the skip control unit 206 does not perform the skip control and the printing data generation software 202 converts the intermediate data into the printing data that the printing apparatus 102 is able to construe may be applicable.

Based on the skip control of the skip control unit 206, the processing of the printing data generation software 202 is skipped. Thereafter, the intermediate data is passed to the printing data edit unit 208 by the OS.

Figure 16:
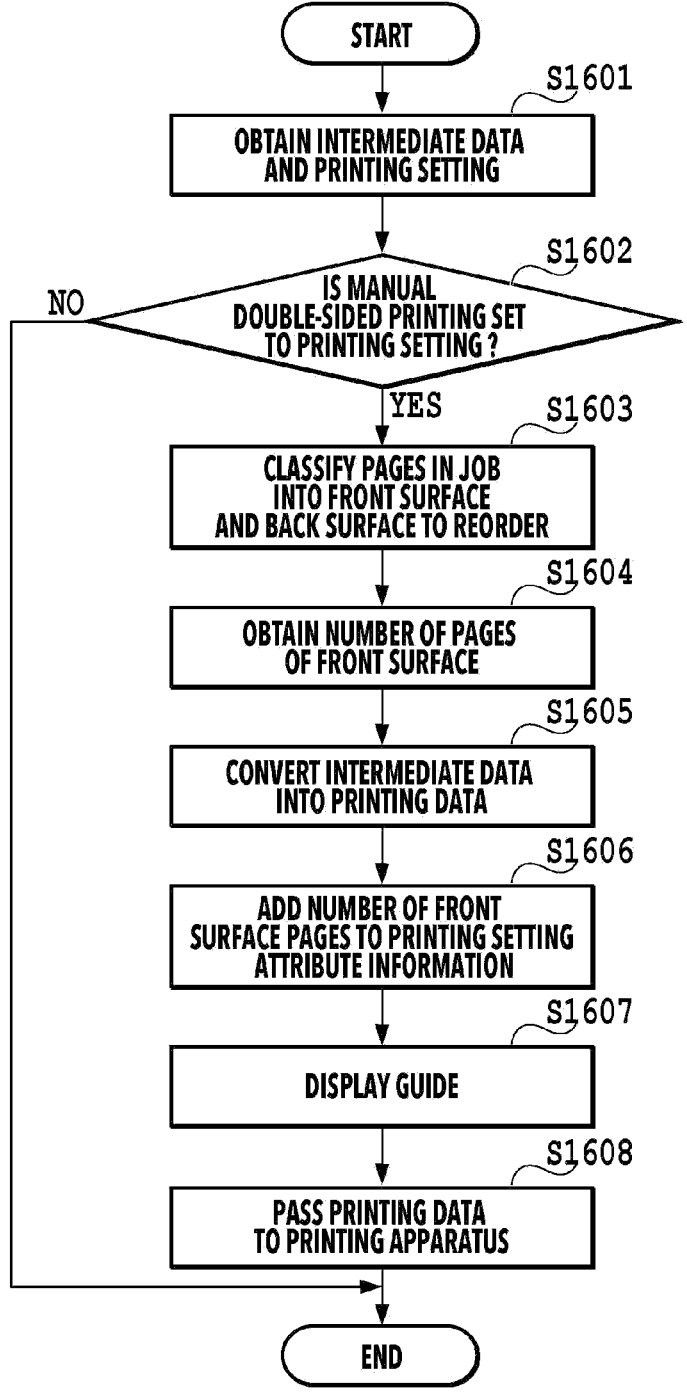
FIG. 16 is a flowchart illustrating an example of the printing data edit processing.

FIG. 16 is a diagram illustrating a main processing flow of the printing data edit unit 208 in a case of the manual double-sided printing setting in the present embodiment. Hereinafter, the printing data edit unit 208 may be described as a unit having a central role in each processing; however, in reality, a corresponding function is implemented by the CPU 111 executing a corresponding program.

First, in S1601, the printing data edit unit 208 obtains the intermediate data received from the printing data generation software 202 and the printing setting included in the intermediate data.

Next, in S1602, the printing data edit unit 208 determines whether the manual double-sided printing is set to the printing setting. If the manual double-sided printing is not set, the processing related to the manual double-sided printing is not performed, and thus the printing data edit unit 208 withdraws from the present processing flow. On the other hand, if the manual double-sided printing is set, the processing related to the manual double-sided printing is performed, and thus the processing by the printing data edit unit 208 proceeds to S1603.

In S1603, based on the printing setting obtained in S1601, the printing data edit unit 208 classifies a page to be arranged on the front surface and a page to be arranged on the back surface in a case of the double-sided printing out of the pages included in the intermediate data. The classifying method is similar to the method described in FIG. 8 of the first embodiment. As with the first embodiment, in a case where the pages of the intermediate data are divided and passed to the printing data edit unit 208, the classification is performed after waiting until all the pages are passed to the printing data edit unit 208.

The group 801 indicating the pages of the intermediate data before the classification in FIG. 8 is classified into the group 802 of the front surface page and the group 803 of the back surface page once the pages are classified so as to be bound in the long-edge binding in the left binding direction. As with the first embodiment, the group 802 is arranged in the order of the pages 804 and 806, and the group 803 is arranged in the order of the pages 805 and 807. Next, the printing data edit unit 208 reorders the page order of the intermediate data into the order of the front surface page and the back surface page. In the example in FIG. 8, the page order is reordered into the order of the group 802 and the group 803. As a result, the page order is reordered into the order of the pages 804, 806, 805, and 807 (Pages 1, 3, 2, and 4).

Next, in S1604, the printing data edit unit 208 obtains the number of the front surface pages based on the classification result in S1603. The number of the front surface pages is information indicating how many pages of the intermediate data in which the pages are reordered are the front surface pages. With the information being transmitted to the printing apparatus 102, the printing apparatus 102 is able to display the guide in a timing in which all the front surface pages are printed. In the case of the example in FIG. 8, the front surface pages are two pages; thus, the number of the front surface pages is "2".

Next, in S1605, the printing data edit unit 208 converts the intermediate data into the printing data. Additionally, in S1606, the printing data edit unit 208 adds the number of the front surface pages obtained in S1604 as attribute information to the printing setting attribute information in the printing data. The printing setting attribute information includes the attribute information indicating the paper size and so on, and the printing apparatus 102 performs printing in accordance with the attribute information. Next, in S1607, the printing data edit unit 208 displays the guide screen.

Figure 17:
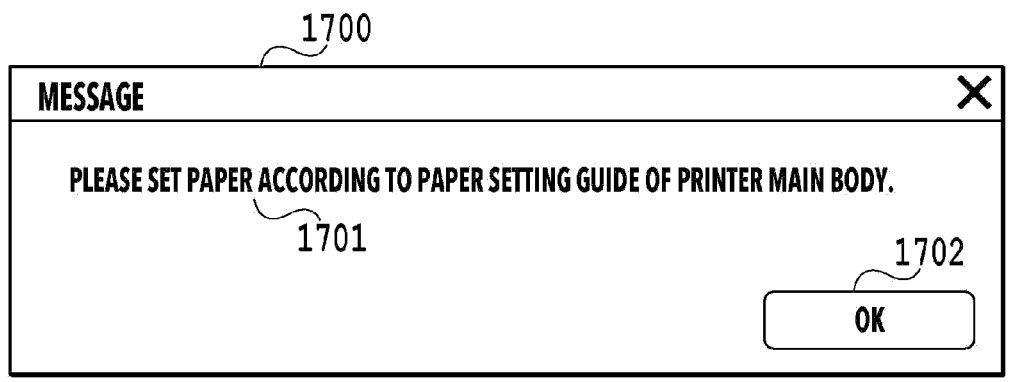
FIG. 17 is a diagram illustrating an example of a guide screen.

FIG. 17 is a diagram illustrating an example of the guide screen displayed by the printing data edit unit 208. A manual double-sided printing guide 1700 is a screen including a message 1701 and an OK button 1702. The message 1701 displays a message indicating that the paper setting guide is displayed on the printing apparatus 102. Once the user presses the OK button 1702, the manual double-sided printing guide 1700 is closed, and the printing data edit unit 208 continues the following processing. In S1608, the printing data edit unit 208 passes the printing data to the printing apparatus 102 through the OS.

Processing Flow of Printing Apparatus

Figure 18:
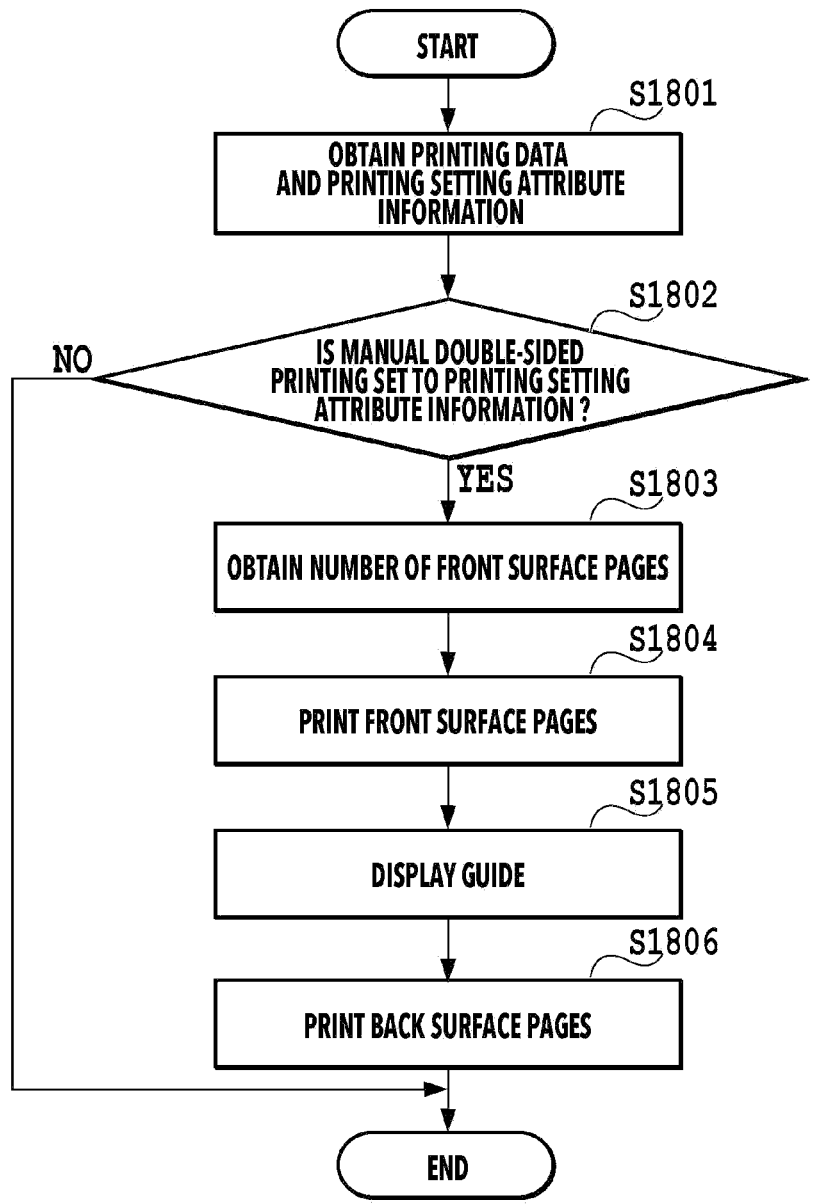
FIG. 18 is a diagram illustrating a flow mainly including manual double-sided printing processing of the printing apparatus.

FIG. 18 is a diagram illustrating a flow mainly including the manual double-sided printing processing of the printing apparatus 102 in a case where the printing apparatus 102 accepts the printing job in the present embodiment. The processing of the printing apparatus 102 in the present embodiment is described with reference to FIG. 18. Hereinafter, the printing apparatus 102 may be described as a unit having a central role in each processing; however, in reality, with the CPU included in the printing apparatus executing a corresponding program, a corresponding function is implemented.

First, in S1801, the printing apparatus 102 accepts the printing data and obtains the printing data and the printing setting attribute information in the printing data. Next, the printing apparatus 102 determines whether the manual double-sided printing is set to the printing setting attribute information. If the manual double-sided printing is not set, the printing apparatus 102 withdraws from the present processing flow without performing the processing of the manual double-sided printing. On the other hand, if the manual double-sided printing is set, the processing by the printing apparatus 102 proceeds to S1803.

Next, in S1803, the printing apparatus 102 obtains the number of the front surface pages included in the printing setting attribute information. Next, in S1804, the printing apparatus 102 prints only the front surface pages based on the number of the front surface pages. In a case of the page configuration of the example in FIG. 8, the number of the obtained front surface pages is "2". Therefore, the printing apparatus 102 prints two pages from the first page of the printing data accepted in S1801. Next, in S1805, the printing apparatus 102 displays the guide screen related to the paper setting procedure on the display unit such as a liquid crystal panel included in the printing apparatus 102.

Figure 19:
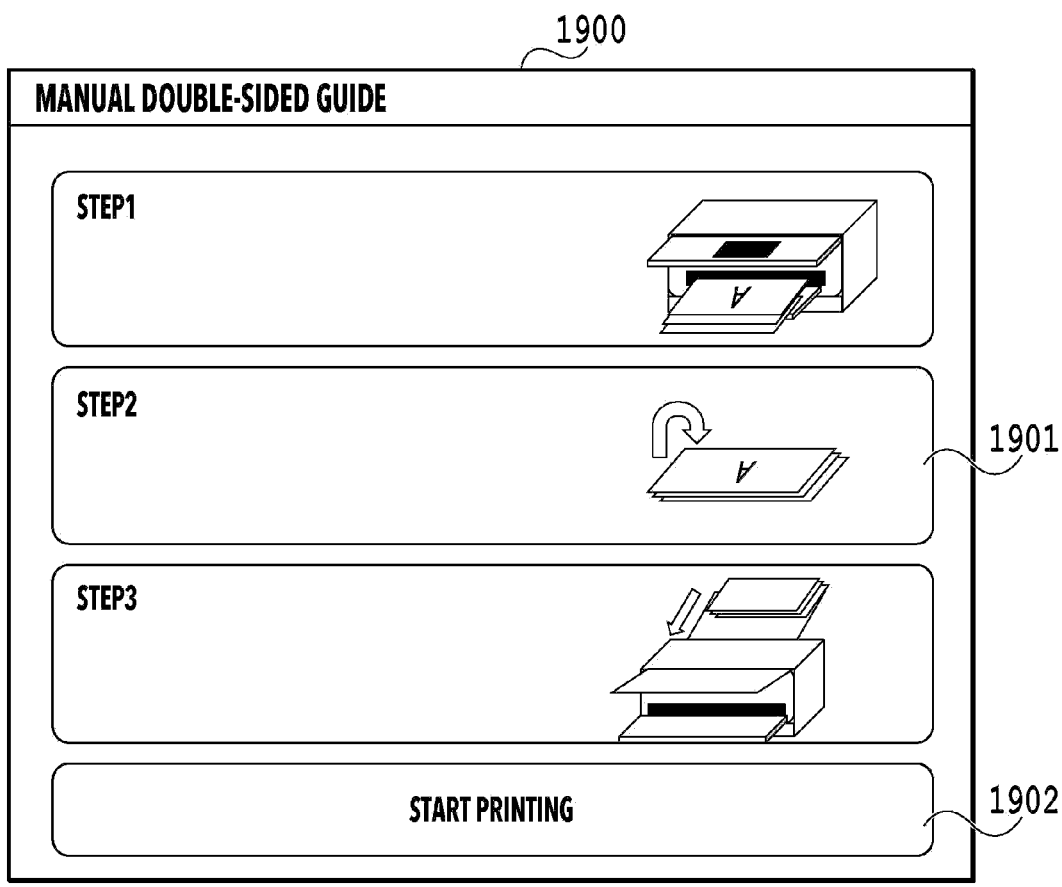
FIG. 19 is a diagram illustrating an example of the guide screen displayed on the printing apparatus.

FIG. 19 is a diagram illustrating an example of the guide screen related to the paper setting procedure displayed on the liquid crystal panel included in the printing apparatus 102. A guide screen 1900 includes paper setting procedure 1901 and a printing start button 1902. The paper setting procedure 1901 describes a method of setting the ejected paper on which the front surface page is printed to the paper feeding opening. The paper setting procedure 1901 displays procedure corresponding to the setting of the paper ejection destination after the front surface page printing and the paper feeding destination in a case of the back surface page printing. Once the user presses the printing start button 1902, the processing by the printing apparatus 102 proceeds to S1806. At this point, the printing apparatus 102 may return an error with Attribute of the IPP. In this case, a configuration in which the notification unit 209 of the extension application 204, which is called in response to the error, displays the screen of the paper procedure guide or the like may be applicable.

Next, in S1806, the printing apparatus 102 prints the rest of the pages of the printing data accepted in S1801. In other words, the printing apparatus 102 prints the back surface page.

With the above, it is possible to implement the manual double-sided printing function in a case of displaying the paper setting guide in the printing apparatus 102. In the present embodiment, the function of performing the processing of the manual double-sided printing is needed on the printing apparatus 102 side. In other words, the printing apparatus 102 needs to have the processing flow in FIG. 18 and the function of displaying the paper procedure guide in FIG. 19. However, according to the processing in the present embodiment, unlike the first embodiment, there is a merit that another job does not interrupt during the manual double-sided printing processing of the extension application 204.

According to the present embodiment, in a timing of processing the job, the extension application 204 can notify the user in advance of that the paper setting guide is to be displayed on the printing apparatus side. With this, it is possible to make a flow line to the paper setting guide, and it is possible to improve the usability.

Third Embodiment

In the first embodiment and the second embodiment, there is described an example in which, as a specific function, the manual double-sided printing function is added as an extended function and the paper setting guide is displayed in a proper timing. In the present embodiment, here is described an example in which the paper setting guide is displayed in a proper timing in a mode other than the manual double-sided printing function. For example, the extension application is able to display the paper setting guide in a case of postcard printing. In the present embodiment, here is described an example of displaying a postcard paper setting guide in a case where "postcard" is set to the paper size or the paper type as the printing setting information. Hereinafter, a configuration and processing that are not mentioned in the descriptions are equivalent to the first embodiment; for this reason, the descriptions are omitted.

Once the user sets "postcard" to the paper size or the paper type on the printing setting screen 600 and a job is added to the printing queue associated with the extension application 204, the OS calls the skip control unit 206. The present embodiment is described with a configuration in which the skip control unit 206 performs the skip control and the printing data edit unit 208 converts the intermediate data into the printing data that the printing apparatus 102 is able to construe; however, it is not limited thereto.

Based on the skip control of the skip control unit 206, the processing of the printing data generation software 202 is skipped. Thereafter, the OS passes the intermediate data to the printing data edit unit 208.

Figure 20:
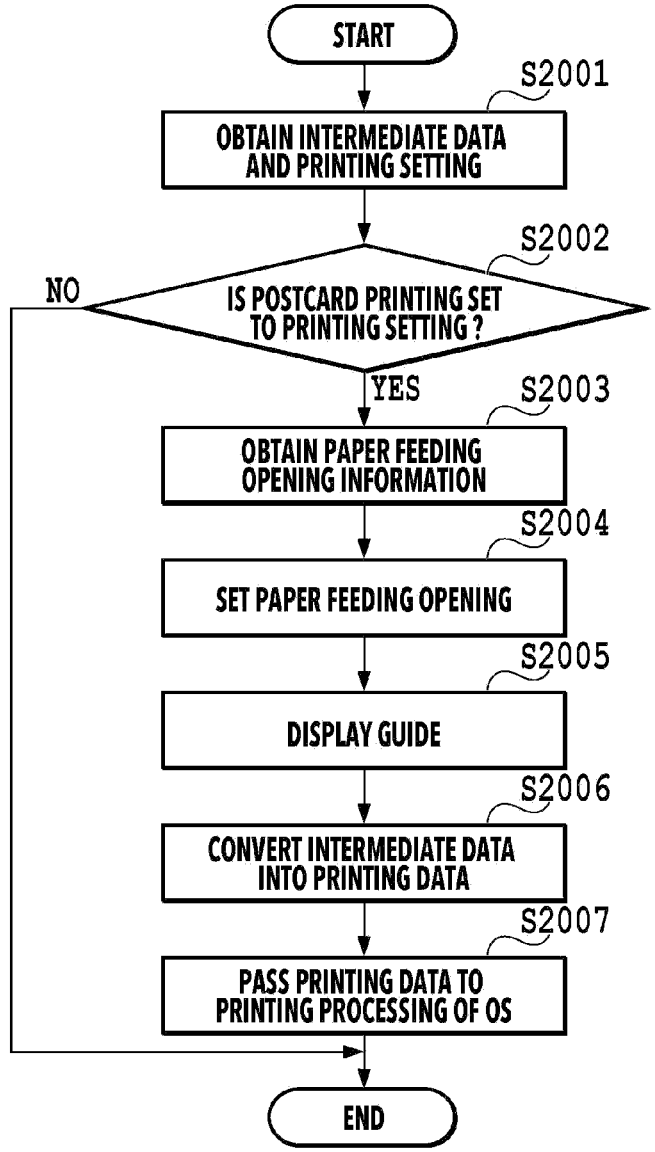
FIG. 20 is a flowchart illustrating an example of the printing data edit processing.

FIG. 20 is a diagram illustrating a main processing flow in a case where the printing data edit unit 208 displays the postcard guide. First, in S2001, the printing data edit unit 208 obtains the intermediate data and the printing setting included in the intermediate data.

Next, in S2002, the printing data edit unit 208 determines whether the printing setting obtained in S2001 is the postcard printing. In the present embodiment, a case where "postcard" is set to either of the paper size and the paper type is described as the postcard printing. If it is not the postcard printing, the printing data edit unit 208 withdraws from the present processing flow without performing the processing related to the postcard guide display. On the other hand, if it is determined that it is the postcard printing, the processing by the printing data edit unit 208 proceeds to S2003 to perform the processing related to the guide display.

Next, in S2003, the printing data edit unit 208 obtains the information on the paper feeding opening included in the printing apparatus 102 from the capability information (PC) based on the printing setting included in the intermediate data. The processing of obtaining the paper feeding opening information is similar to the processing described in S1001 in the first embodiment.

Next, in S2004, the printing data edit unit 208 performs setting of the paper feeding opening used for the postcard printing to the printing setting included in the intermediate data. Based on the paper feeding opening information obtained in S2003, the printing data edit unit 208 sets the paper feeding opening that is settable to the printing apparatus 102. The method of determining the paper feeding opening is not limited and, for example, a method of setting a paper feeding opening determined in advance depending on the combination of the paper feeding openings mounted in the printing apparatus may be applicable.

Next, in S2005, the printing data edit unit 208 displays the guide screen indicating the paper setting procedure.

Figure 21:
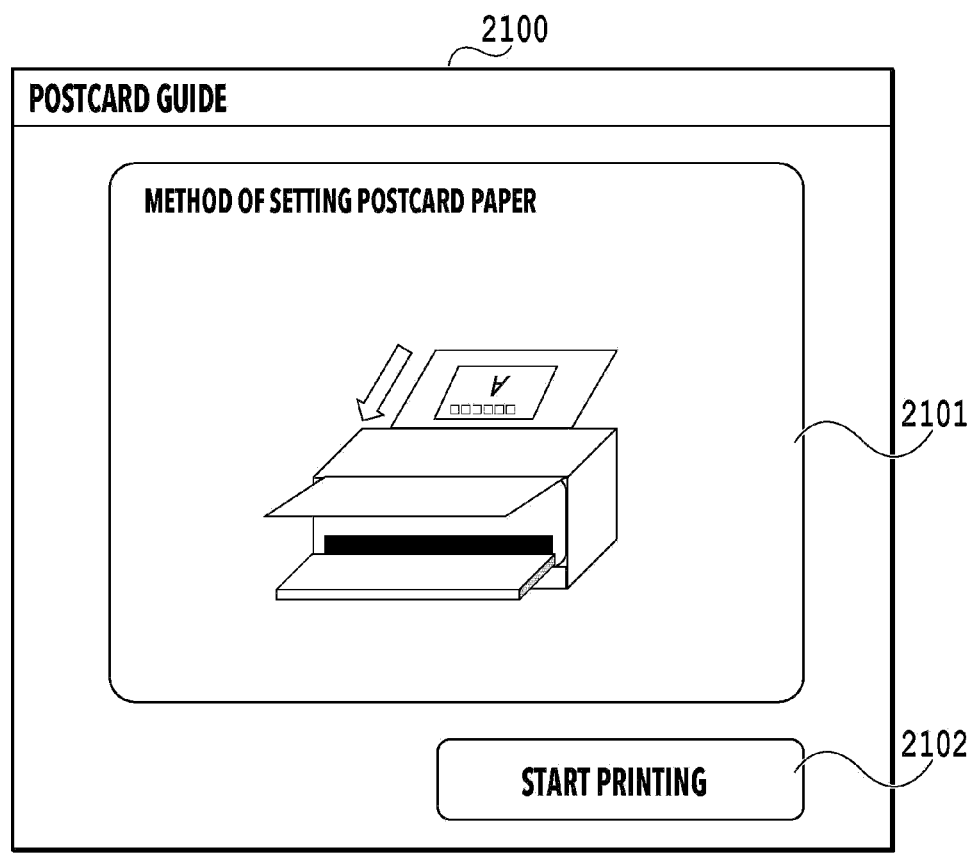
FIG. 21 is a diagram illustrating an example of a postcard printing guide.

FIG. 21 is a diagram illustrating an example of the postcard printing guide. A guide screen 2100 includes paper setting procedure 2101 and a printing start button 2102. The paper setting procedure 2101 is a guide related to a method of setting postcard paper to the paper feeding opening. The paper setting procedure 2101 to be displayed is the one corresponding to the paper feeding opening set in S2004. The printing start button 2102 is a button for the user to instruct starting of the printing, and once the button is pressed, the printing data edit unit 208 closes the guide screen 2100 and continues the processing in and after S2006.

In S2006, the printing data edit unit 208 converts the intermediate data into the printing data that the printing apparatus 102 is able to construe. In S2007, the printing data edit unit 208 passes the printing data converted in S2006 to the printing apparatus through the OS. Thereafter, paper is fed by the printing apparatus 102 from the paper feeding opening designated in S2004, and the printing starts.

With the above, the extension application is able to display the guide of the paper feeding method in a case of the postcard printing. The present embodiment is similarly applicable also to a case other than the guide display in a case of the postcard printing that is a case where a guide is desired to be displayed for disc label printing, envelope printing, and the like. The printing medium as a target may be a medium other than paper.

As described above, with the application of the technique of the present disclosure, it is possible to provide the guide display function as a function that cannot be implemented only with a standard driver (extended function). Therefore, it is possible to provide a better function by the extension application.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-141465, filed Aug. 31, 2021, which is hereby incorporated by reference wherein in its entirety.

What is claimed is:

1. A control method for controlling an information processing apparatus, the control method performed based on execution of a print setting application that extends a function of printing data generation software provided by a vendor of an operating system of the information processing apparatus, the control method comprising:
   providing print setting information based on print settings set via a print setting screen provided by the print setting application, wherein the print setting information includes first information indicating that a manual double-sided printing is enabled; and
   causing a display of the information processing apparatus that has received a notification transmitted by a printer that has received the print setting information to display a screen related to the manual double-sided printing.

2. The control method according to claim 1, the control method further comprising:
   adding second information related to the manual double-sided printing in a case where capability information of the printer does not include the second information.

3. The control method according to claim 2, wherein the capability information is generated by the printing data generation software.

4. The control method according to claim 1, wherein the screen indicates a user operation related to the manual double-sided printing.

5. The control method according to claim 1, wherein the print setting screen includes an object for enabling the manual double-sided printing.

6. The control method according to claim 1, wherein the print setting application is provided by the vendor of the printer.

7. The control method according to claim 1, the control method further comprising:
   outputting intermediate data that is arranged according to the manual double-sided printing in a case where the manual double-sided printing is enabled.

8. The control method according to claim 1, wherein the manual double-sided printing is a function such that an image is printed on one-side of a paper and another image is printed on another side of the paper that has been turned back by a user.

9. A non-transitory computer readable storage medium storing a print setting application that causes an information processing apparatus storing a print setting application that extends a function of printing data generation software provided by a vendor of an operating system of the information processing apparatus to perform a control method, the control method comprising:
   providing print setting information based on print settings set via a print setting screen provided by the print setting application, wherein the print setting information includes first information indicating that a manual double-sided printing is enabled; and
   causing a display of the information processing apparatus that has received a notification transmitted by a printer that has received the print setting information to display a screen related to the manual double-sided printing.

10. The non-transitory computer readable storage medium according to claim 9, the control method further comprising:
    adding second information related to the manual double-sided printing in a case where capability information of the printer does not include the second information.

11. The non-transitory computer readable storage medium according to claim 10, wherein the capability information is generated by the printing data generation software.

12. The non-transitory computer readable storage medium according to claim 9, wherein the screen indicates a user operation related to the manual double-sided printing.

13. The non-transitory computer readable storage medium according to claim 9, wherein the print setting screen includes an object for enabling the manual double-sided printing.

14. The non-transitory computer readable storage medium according to claim 9, wherein the print setting application is provided by a vendor of the printer.

15. The non-transitory computer readable storage medium according to claim 9, the control method further comprising:
    outputting intermediate data that has been arranged according to the manual double-sided printing in a case where the manual double-sided printing is enabled.

16. The non-transitory computer readable storage medium according to claim 9, wherein the manual double-sided printing is a function such that an image is printed on one-side of a paper and another image is printed on another side of the paper that has been turned back by a user.

17. An information processing apparatus comprising:
    a memory configured to store printing data generation software provided by a vendor of an operating system of the information processing apparatus and a print setting application that extends a function of the printing data generation software; and
    a controller configured to:
    provide print setting information based on print settings set via a print setting screen provided by the print setting application, wherein the print setting information includes first information indicating that a manual double-sided printing is enabled; and
    cause a display of the information processing apparatus that has received a notification transmitted by a printer that has received the print setting information to display a screen related to the manual double-sided printing.

* * * * *